(12) United States Patent
Youm et al.

(10) Patent No.: US 9,812,768 B2
(45) Date of Patent: Nov. 7, 2017

(54) ANTENNA DEVICE AND MANUFACTURING METHOD THEREOF

(71) Applicant: SAMSUNG ELECTRONICS CO., LTD., Suwon-si, Gyeonggi-do (KR)

(72) Inventors: Byeong-Hwan Youm, Suwon-si (KR); Gi-Uk Gang, Suwon-si (KR); Kyung-Bin Kim, Hwaseong-si (KR); Seung-Hwan Kim, Seoul (KR); Austin Kim, Seongnam-si (KR); Joon-Ho Byun, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 122 days.

(21) Appl. No.: 14/851,580

(22) Filed: Sep. 11, 2015

(65) Prior Publication Data

US 2016/0079663 A1 Mar. 17, 2016

(30) Foreign Application Priority Data

Sep. 12, 2014 (KR) .................. 10-2014-0121215

(51) Int. Cl.
| | |
|---|---|
| *H01Q 1/24* | (2006.01) |
| *H01Q 1/40* | (2006.01) |
| *B29C 45/16* | (2006.01) |
| *B29K 69/00* | (2006.01) |
| *B29L 31/34* | (2006.01) |
| *H04M 1/02* | (2006.01) |

(52) U.S. Cl.
CPC ............ *H01Q 1/40* (2013.01); *B29C 45/1671* (2013.01); *H01Q 1/243* (2013.01); *B29C 2045/1673* (2013.01); *B29K 2069/00* (2013.01); *B29K 2995/0025* (2013.01); *B29K 2995/0026* (2013.01); *B29L 2031/3437* (2013.01); *B29L 2031/3456* (2013.01); *B29L 2031/3481* (2013.01); *H04M 1/026* (2013.01)

(58) Field of Classification Search
CPC .................................. H01Q 1/40; H01Q 1/243
See application file for complete search history.

(56) References Cited

U.S. PATENT DOCUMENTS

| | | | | |
|---|---|---|---|---|
| 8,618,989 B2* | 12/2013 | Sung | ................ | B29C 45/14065 343/702 |
| 8,711,041 B2* | 4/2014 | Han | ................ | B29C 45/14065 343/702 |
| 8,816,932 B2* | 8/2014 | Kawaguchi | ......... | C23C 14/0015 235/487 |

(Continued)

FOREIGN PATENT DOCUMENTS

| | | |
|---|---|---|
| JP | 2009-273104 | 11/2009 |
| KR | 10-0955510 | 4/2010 |

(Continued)

*Primary Examiner* — Hoang Nguyen
(74) *Attorney, Agent, or Firm* — Nixon & Vanderhye, P.C.

(57) ABSTRACT

An example antenna device may includes a base member, an antenna that is attached to the base member, and a cover member that is attached to surround at least a part of the base member and at least a part of the antenna. A first part of the base member that is attached to the cover member has a melting temperature equal to or lower than that of the cover member. A second part of the base member to which the antenna is attached has a higher melting temperature than the cover member.

10 Claims, 19 Drawing Sheets

(56) References Cited

U.S. PATENT DOCUMENTS

| | | | |
|---|---|---|---|
| 2009/0015490 A1* | 1/2009 | Honda | H01Q 1/243 343/702 |
| 2009/0280316 A1 | 11/2009 | Lee et al. | |
| 2011/0316759 A1* | 12/2011 | Fan | H01Q 1/42 343/873 |
| 2014/0313085 A1 | 10/2014 | Sung et al. | |

FOREIGN PATENT DOCUMENTS

| | | |
|---|---|---|
| KR | 10-2012-0066104 | 6/2012 |
| KR | 10-2012-0074552 | 7/2012 |

* cited by examiner

ANTENNA DEVICE AND MANUFACTURING METHOD THEREOF

CROSS-REFERENCE TO RELATED APPLICATION

This application claims priority under 35 U.S.C. §119(a) to Korean Application Serial No. 10-2014-0121215, which was filed in the Korean Intellectual Property Office on Sep. 12, 2014, the entire content of which is hereby incorporated by reference.

TECHNICAL FIELD

Various embodiments of the present disclosure relate to an antenna device that is mounted to an electronic device.

BACKGROUND

In recent years, with the development of electronics and communication industries, user devices, such as mobile communication terminals (cellular phones), electronic organizers, personal computer terminals, etc., have become necessities in modern society and have become important means for transferring rapidly changing information.

User devices include antennas for wireless communication. Embedded antennas have recently been preferred for aesthetic reasons.

SUMMARY

Various embodiments of the present disclosure may provide an antenna device in which an antenna is mounted in an injection molded object, thereby achieving anti-vibration and waterproof functions.

In accordance with an aspect of the present disclosure, an antenna device may include: a base member; an antenna that is attached to the base member; and a cover member that is attached to surround at least a part of the base member and at least a part of the antenna. Here, a first part of the base member that is attached to the cover member may have a melting temperature equal to or lower than that of the cover member, and a second part of the base member to which the antenna is attached may have a higher melting temperature than the cover member.

In accordance with another aspect of the present disclosure, an antenna device may include: a base member; an antenna that is attached to the base member; a surface-treated layer for coating at least a part of the base member or at least a part of the antenna; and a cover member that is attached to the surface-treated layer. Here, the base member may have a higher melting temperature than the cover member, and the cover member may have a melting temperature equal to or higher than that of the surface-treated layer.

In accordance with a further aspect of the present disclosure, a method of manufacturing an antenna device may include: molding a base member; attaching an antenna to the base member; and molding a cover member that is attached to surround at least a part of the base member and at least a part of the antenna. Here, a first part of the base member that is attached to the cover member may have a melting temperature equal to or lower than that of the cover member, and a second part of the base member to which the antenna is attached may have a higher melting temperature than the cover member.

In accordance with a yet another aspect of the present disclosure, a method of manufacturing an antenna device may include: molding a base member; attaching an antenna to the base member; molding a surface-treated layer for coating at least a part of the base member or at least a part of the antenna; and molding a cover member that is attached to the surface-treated layer. Here, the base member may have a higher melting temperature than the cover member, and the cover member may have a melting temperature equal to or higher than that of the surface-treated layer.

Damage to an antenna (e.g., deformation, such as split, etc., loss, or the like) can be prevented in the process (e.g., in-molding) of mounting the antenna in an injection molded object.

BRIEF DESCRIPTION OF THE DRAWINGS

The above and other aspects, features, and advantages of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1:
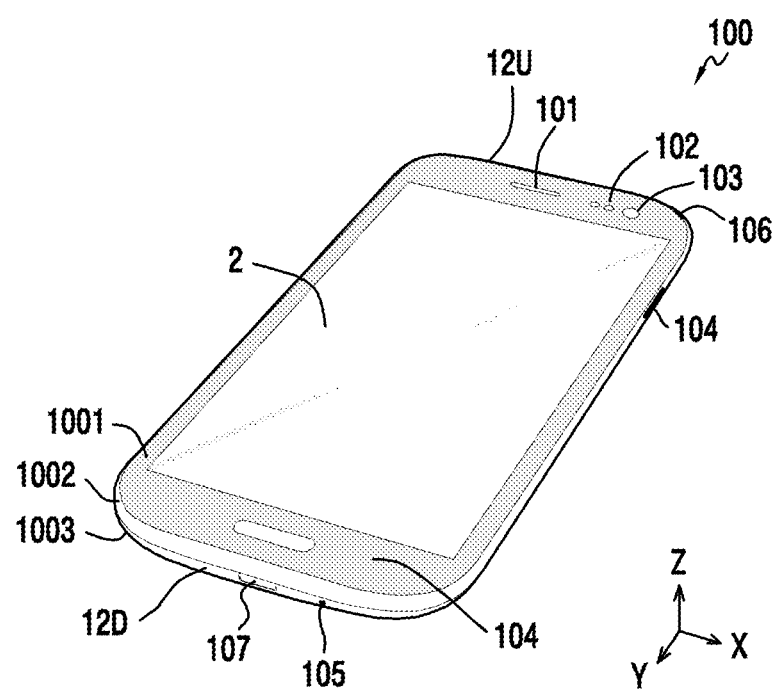
FIG. 1 illustrates an electronic device according to an example embodiment of the present disclosure.

The various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of various embodiments of the present disclosure as defined by the claims and their equivalents. It includes various specific details to assist in that understanding, but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

The expressions "include", "may include", etc. as used in the present disclosure refer to the existence of a corresponding disclosed function, operation or component which may be used in various embodiments of the present disclosure and do not exclude one or more additional functions, operations, or components. In the present disclosure, the expressions such as "include", "have", etc. may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. The expression "or", etc. as used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments, but does not limit the corresponding components. For example, the above expressions do not limit the sequence and/or importance of the elements. The above expressions are used merely for the purpose of distinguishing an element from other elements. For example, a first user device and a second user device indicate different user devices although both of them are user devices. For example, without departing from the scope of the present disclosure, a first component element may be named a second component element. Similarly, the second component element also may be named the first component element.

It should be noted that if one component element is described as being "coupled" or "connected' to another component element, the first component element may be directly coupled or connected to the second component, and a third component element may be "coupled" or "connected" between the first and second component elements. Conversely, when one component element is "directly coupled" or "directly connected' to another component element, no third component element exists between the first component element and the second component element.

The terms in various embodiments of the present disclosure are used to describe various embodiments, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as would be understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device that has a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device (such as a head-mounted-device (HMD), electronic glasses, electronic clothes, an electronic bracelet, an electronic necklace, an electronic accessory (e.g., an electronic device and/or counterpart accessory for a mobile device), an electronic tattoo, a smart watch, or the like).

According to various embodiments, the electronic device may be a smart home appliance with a communication function. The smart home appliance as an example of the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a TV box (such as SAMSUNG HOMESYNC™, APPLE TV™, or GOOGLE TV™), a game console, an electronic dictionary, an electronic key, a camcorder, and an electronic picture frame.

According to various embodiments, the electronic device may include at least one of various medical appliances (such as Magnetic Resonance Angiography (MRA), Magnetic Resonance Imaging (MRI), Computed Tomography (CT) machine, and an ultrasonic machine), navigation devices, Global Positioning System (GPS) receivers, Event Data Recorders (EDRs), Flight Data Recorders (FDRs), automotive infotainment devices, electronic equipment for ships (such as navigation equipment for ships, gyrocompasses, or the like), avionics, security devices, head units for vehicles, industrial or home robots, Automatic Teller Machines (ATMs) of banking facilities, and Point Of Sales (POSs) of shops.

According to various embodiments, the electronic device includes at least one of furniture or a part of a building/structure, an electronic board, an electronic signature receiving device, a projector, and various types of measuring devices (for example, a water meter, an electric meter, a gas meter, a radio wave meter and the like) including an antenna apparatus. An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above-described devices. Hereinafter, an electronic device according to various embodiments will be described with reference to the accompanying drawings. The term "user" used in various embodiments refers to a person who uses an electronic device or a device (for example, an artificial intelligence electronic device) that uses an electronic device.

FIG. 1 illustrates an electronic device according to an example embodiment of the present disclosure.

Referring to FIG. 1, the electronic device 100 may include an upper surface 1001, a side surface 1002, and a lower surface 1003. The side surface 1002 may interconnect the upper and lower surfaces 1001 and 1003. The upper surface 1001, the side surface 1002, or the lower surface 1003 may include a flat surface or a curved surface. For example, the electronic device 100, although not illustrated, may include the upper or lower surface 1001 or 1003 in the shape of a convex or concave curved surface. Alternatively, the electronic device 100 may also have the upper surface 1001, the side surface 1002, or the lower surface 1003 which is flexible or wearable (deformable).

The electronic device 100 may include a display unit 2, a speaker 101, a sensor 102, a camera 103, a button 104, a microphone 105, an antenna 106, or a socket 107.

The display unit 2 may be disposed on the upper surface 1001 of the electronic device 100 to provide a screen. According to an embodiment, the display unit 2 may include a liquid crystal display (LCD), an active matrix organic light emitting diode (AM-OLED), or the like. The display unit 2 may also include a touch detection device (e.g., a touch panel or a digitizer panel) that can recognize a touch input.

The speaker 101 may be disposed on the upper surface 1001 of the electronic device 100. Alternatively, although not illustrated, the speaker 101 may also be disposed on the side surface 1002 or the lower surface 1003 of the electronic device 100.

The sensor 102 may be disposed on the upper surface 1001 of the electronic device 100, but is not limited thereto. The sensor 102 may measure a physical quantity or detect the operating state of the electronic device 100, and may convert the measured or detected information into an electric signal. Such a sensor 102 may include a gesture sensor, a proximity sensor, a grip sensor, a gyro sensor, an acceleration sensor, a terrestrial magnetism sensor, an atmospheric pressure sensor, a temperature/humidity sensor, a Hall sensor, a red/green/blue (RGB) sensor, an illumination sensor, a biometric sensor (e.g., a heart rate sensor), or an ultra violet (UV) sensor.

The camera 103 may be disposed on the upper surface 1001 of the electronic device 100 as illustrated, but is not limited thereto.

The button 104 may be disposed on the upper surface 1001 or the side surface 1002 of the electronic device 100 as illustrated, but is not limited thereto. A press type button or a touch type button may be employed for the button 104.

The microphone 105 may be disposed on the side surface 1002 of the electronic device 100. Alternatively, the microphone 105, although not illustrated, may also be disposed on the upper surface 1001 or the lower surface 1003 of the electronic device 100.

The antenna 106 (e.g., a digital multimedia broadcasting (DMB) antenna, a cellular antenna, or the like) may be extracted to the outside via a through hole (not illustrated) disposed on the side surface 1002 of the electronic device 100 and may then be extended. Alternatively, the antenna 106, although not illustrated, may be mounted on a circuit board (e.g., a main board).

According to an embodiment, although not illustrated, at least one other antenna (e.g., a Bluetooth antenna, a near field communication (NFC) antenna, a global positioning system (GPS) antenna, or a cellular antenna) may be disposed in the interior of the electronic device 100. Such an antenna may be referred to as an "embedded antenna" or an "intenna." Particularly, at least a part of the antenna may be disposed in such a manner as to be inserted into a non-conductive member (e.g., a housing, a case frame, a device case, or other plastic injection molded members) of the electronic device 100. For example, at least a part of the antenna may be surrounded by an injection molded member and accordingly, may be protected from the outside (e.g., vibration or water), or the rigidity of the housing may prevent at least a part of the antenna from being deformed. Such a type of antenna may be referred to as an "in-molding antenna." The in-molding antenna will be described below in detail with reference to the drawings.

The socket 107 may be disposed on the side surface 1002 of the electronic device 100 as illustrated, but is not limited thereto. The socket 107 (e.g., a USB socket, a charging jack, a communication jack, or the like) may be disposed on the lower section 12D of the side surface 1002. Or, a socket (e.g., an earphone jack), which is not illustrated, may be disposed on the upper section 12U of the side surface 1002. The socket 107 is an interface device to which a plug of an external device (e.g., an ear-set, a charger, or the like) may be connected, and may employ a communication scheme, such as high-definition multimedia interface (HDMI), universal serial bus (USB), projector, D-subminiature (D-sub), or the like.

Although not illustrated, the electronic device 100 may further include a stylus. The stylus may be extracted to the outside through a through hole (not illustrated) disposed on the side surface 1002 of the electronic device 100.

Figure 2:
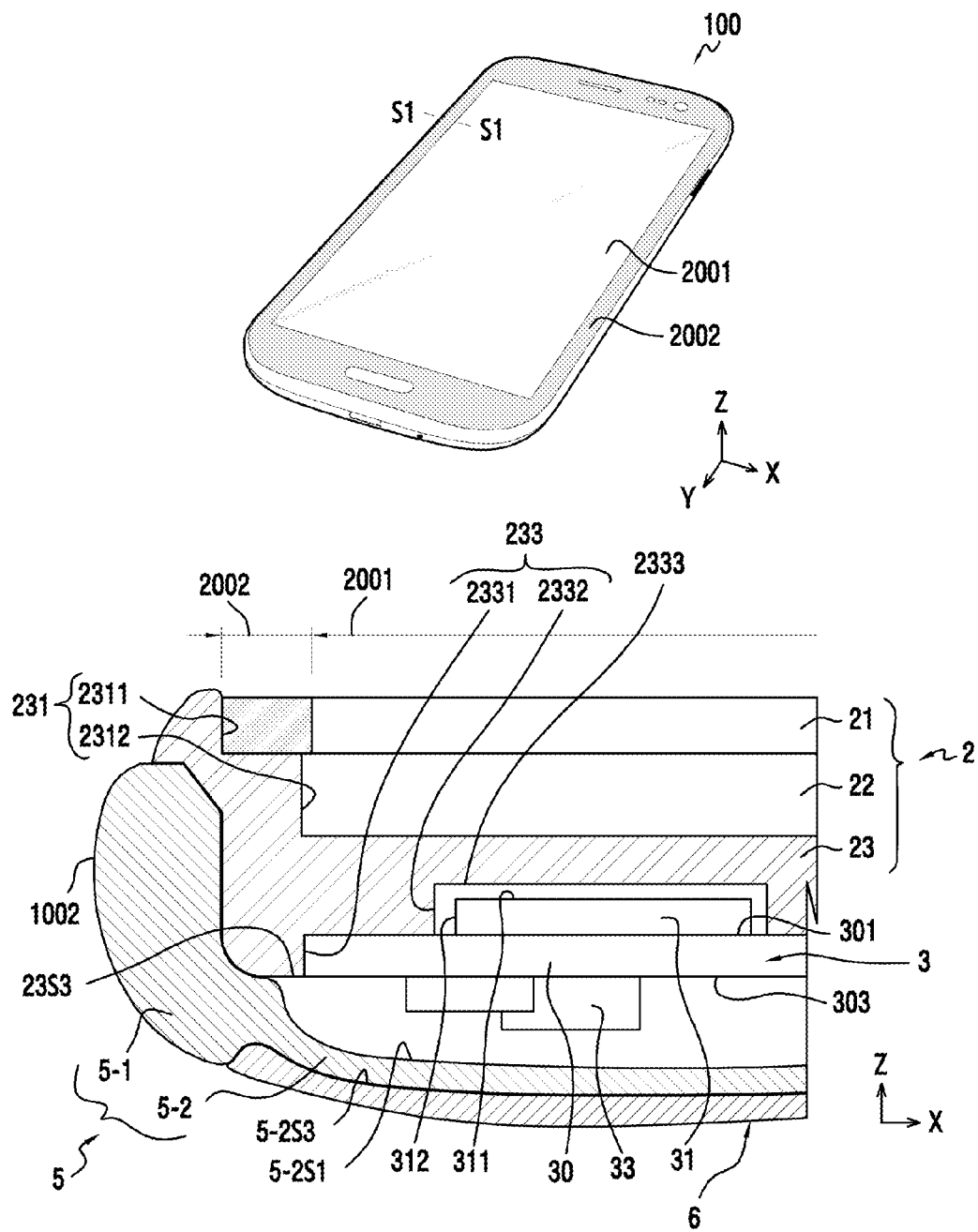
FIG. 2 is a sectional view of the electronic device of FIG. 1.

FIG. 2 is a sectional view of the example electronic device 100 shown in FIG. 1.

Referring to FIG. 2, the electronic device 100 may include the display unit 2, a printed board assembly (PBA) 3, a device case 5, and a cover 6.

The display unit 2 may include a window 21, a display 22, and a bracket 23.

The window 21 may include a transparent plate, a bonding layer, a plastic film, a pattern layer, a metal layer, or a light shielding layer. The transparent plate may be disposed on the display 22 and may protect the display 22. The transparent plate may be molded of plastic, such as acrylic, or glass (e.g., reinforced glass), which is impact resistant.

The bonding layer may be disposed between the transparent plate and the plastic film, and may bond the plastic film to the transparent plate. The bonding layer may be disposed in the peripheral area 2002 (e.g., the rectangular annular area) of the window 21. The bonding layer preferably does not overlap a view area 2001. Here, the view area 2001 may indicate an area where images of the display 22 are displayed and may be referred to as a "display area." The bonding layer may be transparent. Alternatively, the bonding layer may also be dyed by using dye, pigment, coloring matter, fluorescent material, phosphor, or the like that forms a particular color. The bonding layer may include a pressure sensitive adhesive (PSA).

The plastic film may be attached to the peripheral area 2002 of the window 21 by the bonding layer. The plastic film may have a band shape corresponding to the peripheral area 2002 of the window 21. The plastic film preferably does not overlap the view area 2001. The plastic film may be transparent. The plastic film may be molded of a material that has high thermal stability and high mechanical strength. The plastic film may be a polyethyleneterephthalate (PET) film, a polycarbonate (PC) film, a polyethylene (PE) film, a polypropylene (PP) film, or the like.

The pattern layer may include various patterns (e.g., planar patterns or 3D patterns) that are attached to or printed on the lower surface of the plastic film. The pattern layer preferably does not overlap the view area 2001. The pattern layer may be molded through ultraviolet (UV) molding. The pattern layer molded through UV molding may have a pattern corresponding to that formed on a mold. The pattern of the mold may be formed through mechanical working, laser processing, photolithography, or the like. The pattern layer may reflect external light and may express a metal texture. The pattern layer may be a hairline pattern. Since the pattern layer is disposed below the transparent plate that has a predetermined thickness, the pattern of the pattern layer may be shown in three dimensions through the transparent plate.

The metal layer may be attached to the lower surface of the pattern layer. The metal layer preferably does not overlap the view area 2001. The metal layer may be formed by deposit (e.g., physical vapor deposition (PVD) or chemical vapor deposition (CVD)) or coat metal (e.g., Sn, Al, Si, Ti, TiC, TiN, TiCB, $Al_2O_3$, or the like) on the lower surface of the pattern layer. The metal layer may reflect external light and may express a metal texture. Since the metal layer is disposed below the transparent plate that has a predetermined thickness, the pattern of the metal layer may be shown in three dimensions through the transparent plate.

A portion of the transparent plate that does not correspond to the view area 2001 may express a metal texture due to the pattern layer and the metal layer.

The light shielding layer may be formed on the lower surface of the metal layer. The light shielding layer preferably does not overlap the view area 2001. The light shielding layer may shield external light emitted to the peripheral area of the transparent plate. The light shielding layer may prevent light from the display 22 from being emitted to the peripheral area of the transparent plate. The light shielding layer may include a black component that absorbs light rather than reflect light. The light shielding layer may be a layer printed in black. The light shielding layer may be an adhesive containing a black component. The light shielding layer may include a black film and an adhesive material.

The display 22 may be disposed below the window 21. For example, the display 22 may be attached to the transparent bonding layer and may be disposed below the light shielding layer. The display 22 may include a display panel (not illustrated). For example, the display panel may be a liquid crystal display (LCD), an active matrix organic light emitting diode (AM-OLED), or the like.

The display 22 may be implemented to be flexible, transparent, or wearable. Here, the window 21 may also be implemented to be flexible or wearable.

Alternatively, the display unit 2 may further include a circuit board. The circuit board may be disposed below the display panel. The PBA 3 may control images displayed through the display 22 by using the circuit board.

The display unit 2 may further include a touch panel (not illustrated). The touch panel (e.g., a capacitive type touch panel, a resistive type touch panel, or the like) may be disposed between the window 21 and the display 22. Alternatively, the display unit 2 may further include a digitizer panel (not illustrated). The digitizer panel may be disposed below the display panel. Here, the view area 2001 where a touch input can be made using the touch panel or the digitizer panel may be referred to as a "touch input area."

The PBA 3 may sense a touch input through the touch panel or the digitizer panel by using the above-described circuit board.

The bracket 23 may include a mounting plate on which a plurality of electronic components may be mounted. The bracket 23 may include an upper mounting part 231 and a lower mounting part 233.

The upper mounting part 231 is a part where the window 21 and the display 22 are disposed, and may include at least a portion of the upper surface of the bracket 23. The upper mounting part 231 may have various shapes including a flat surface and/or a curved surface. For example, the upper mounting part 231 may be open at the upper side thereof. The window 21 may be disposed on the upper side 2311 (e.g., an upper opening portion) of the upper mounting part 231, and the display 22 may be disposed on the lower side 2312 of the upper mounting part 231. According to an embodiment, the window 21 and the display 22 may be attached to the upper mounting part 231 of the bracket 23 by using an adhesive.

The lower mounting part 233 is a part where the PBA 3 is disposed, and may include at least a portion of the lower surface 23S3 of the bracket 23. The lower mounting part 233 may have various shapes including a flat surface and/or a curved surface. The lower mounting part 233 may include a substrate disposition part 2331 and a substrate-mounted component disposition part 2332.

The substrate disposition part 2331 may be a part where a substrate 30 of the PBA 3 is disposed. The substrate disposition part 2331 may include a boss (not illustrated). The substrate 30 may be secured to the substrate disposition part 2331 through bolt fastening.

The substrate-mounted component disposition part 2332 may be a part where an electronic component 31 protruding from the upper surface 301 of the substrate 30 is disposed.

The bracket 23 may provide a desired rigidity of the display unit 2. The bracket 23 may also shield electrical noise. The bracket 23 may include a heat dissipation plate that prevents an electronic component from being heated. Here, the bracket 23 may diffuse heat from the display 22 or the PBA 3.

According to an embodiment, the bracket 23 may contain a metal material (e.g., Mg, Al, or the like). The bracket 23 may be molded by using various means such die casting, computerized numerical control (CNC), and the like.

The PBA 3 may include a circuit board, a main board, or a mother board. The PBA 3 may configure an execution environment of the electronic device 100, maintain the information, and may allow the electronic device 100 to be stably driven. In addition, the PBA 3 may allow all devices of the electronic device 100 to effectively perform data input/output exchange.

The PBA 3 may be disposed between the display unit 2 and the device case 5. For example, the PBA 3 may be disposed on the lower mounting part 233 of the bracket 23. The PBA 3 may include the substrate 30, the substrate-upper-side mounted component 31 and a substrate-lower-side mounted component 33.

The substrate 30 may include a plate on which an electrical circuit is formed. The upper surface 301 of the substrate 30 may make contact with at least a portion of the lower surface 23S3 of the bracket 23. The lower surface 303 of the substrate 30 may face the device case 5.

The substrate-upper-side mounted component 31 may protrude upward from the upper surface 301 of the substrate 30 and may be disposed on the substrate-mounted component disposition part 2332 of the bracket 23. The substratelower-side mounted component 33 may protrude downward from the lower surface 303 of the substrate 30.

The substrate-upper-side mounted component 31 and/or the substrate-lower-side mounted component 33 may be of a surface mount device (SMD) type or a dual in line package (DIP) type.

The device case 5 may include a first case body 5-1 and a second case body 5-2. The first case body 5-1 is a part where the display unit 2 is mounted, and may include the side surface 1002 of the electronic device 100. The first case body 5-1 may be fastened to the bracket 23 of the display unit 2 with bolts.

The second case body 5-2 may extend from the first case body 5-1 and may be disposed between the PBA 3 and the cover 6. The second case body 5-2 may include an upper surface 5-2S1 facing the lower surface 303 of the PBA 3 and a lower surface 5-2S3 on which the cover 6 is mounted. Alternatively, the cover 6 may be easily attached to and detached from the second case body 5-2. For example, the cover 6 may include a plurality of hooks (not illustrated) arranged on the periphery thereof, and the second case body 5-2 may include a plurality of hook fastening recesses to which the plurality of hooks of the cover 6 are fastened. Here, the method by which the plurality of hooks of the cover 6 and the plurality of hook fastening recesses of the second case body 5-2 are fastened to each other may be referred to as a snap-fit fastening method.

Alternatively, the second case body 5-2 may also include a support shape (not illustrated) for supporting the lower surface 303 of the PBA 3.

Or, the second case body 5-2 may be fastened to the display unit 2 with bolts.

The cover 6 may include the lower surface (reference numeral 1003 of FIG. 1) of the electronic device 100. The cover 6 may be separated from the device case 5 when a non-illustrated detachable electronic component (e.g., a memory card, a battery pack, or the like) is replaced. The cover 6 may be referred to as a battery cover. The exposed surface (the lower surface 1003 of the electronic device 100) of the cover 6 may include a curved surface. The exposed surface of the cover 6 may be smoothly connected to the exposed surface of the device case 5 (the side surface 1002 of the electronic device 100) to make the outer surface of the electronic device 100 appealing.

A combination of the bracket 3, the device case 5, and the cover 6 may be referred to as a housing.

Figure 3:
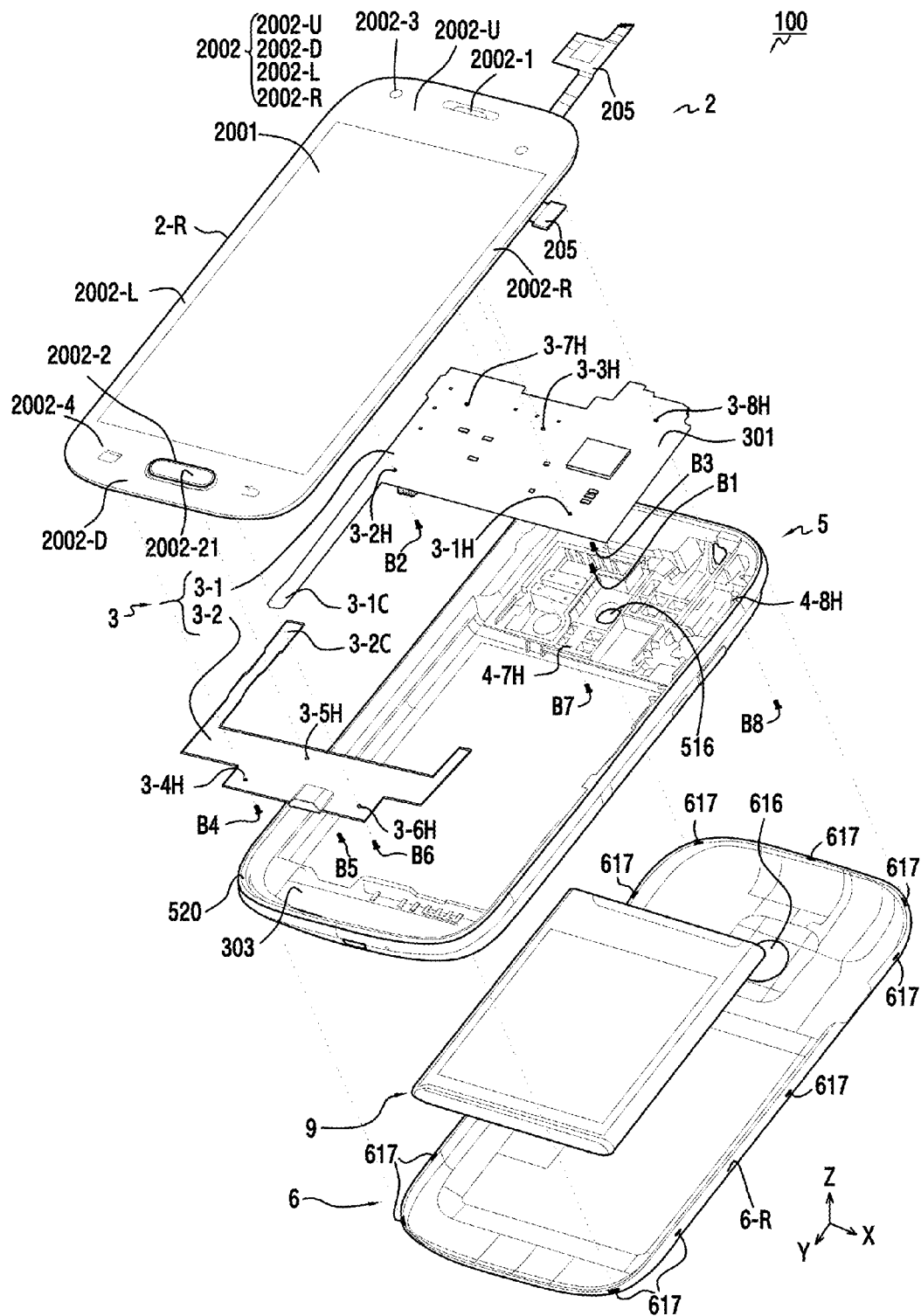
FIG. 3 is an exploded perspective view of the electronic device of FIG. 1.

FIG. 3 is an exploded perspective view of the electronic device 100 of FIG. 1.

Referring to FIG. 3, the electronic device 100 may include the display unit 2, the PBA 3, the device case 5, a battery pack 9, or the cover 6.

The display unit 2 may generally have a quadrangular (e.g., rectangular) flat plate shape. The display set 2 may include a display area 2001 and a non-display area 2002. The display area 2001 may correspond to an image displayable area, namely a screen, of the display (reference numeral 22 of FIG. 2). The display area 2001 may have a rectangular shape extending in the Y-axis direction. The non-display area 2002 (e.g., the peripheral area 2002 of FIG. 2) surrounds the display area 2001 and may have an annular shape. For example, the non-display area 2002 may include an upper peripheral area 2002-U, a lower peripheral area 2002-D, a left peripheral area 2002-L, and a right peripheral area 2002-R. The upper and lower peripheral areas 2002-U and 2002-D may be disposed to be opposite from each other. In addition, the left and right peripheral areas 2002-L and 2002-R may be disposed to be opposite from each other. The upper and lower peripheral areas 2002-U and 2002-D may have a larger width than the left and right peripheral areas 2002-L and 2002-R. The non-display area 2002 may be represented in black. Alternatively, the non-display area 2002 may also represent a metal texture.

The display unit 2 may have a receiver hole 2002-1 formed in the non-display area 2002 (e.g., the upper peripheral area 2002-U). The receiver hole 2002-1 may be positioned to correspond to a receiver (not illustrated) mounted on the PBA 3 or the device case 5, and a sound output from the receiver may come out through the receiver hole 2002-1.

According to an embodiment, the display unit 2 may have a button hole 2002-2 formed in the non-display area 2002 (e.g., the lower peripheral area 2002-D). The display unit 2 may include a button circuit (not illustrated) disposed between the window (reference numeral 21 of FIG. 2) and the bracket (reference numeral 23 of FIG. 2). A button 2002-21 of the button circuit may be disposed on the upper surface (reference numeral 1001 of FIG. 1) of the electronic device 100 through the button hole 2002-2.

The display unit 2 may further include a transparent area 2002-3 disposed in the non-display area 2002. The transparent area 2002-3 may be disposed to correspond to a sensor (e.g., an illumination sensor, an image sensor, or the like) mounted on the PBA 3.

The display unit 2 may further include touch key markers 2002-4 disposed in the non-display area 2002. The touch key markers 2002-4 may be disposed on opposite sides of the button hole 2002-2. The display set 2 may include a touch key circuit (not illustrated) disposed between the window 21 and the bracket 23. The touch key circuit may be disposed to correspond to the touch key markers 2002-4.

The display unit 2 may include an electric connection unit 205. The electric connection unit 205 may be used to electrically connect the PBA 3 and the display (reference numeral 22 of FIG. 2) mounted on the display unit 2 or a non-illustrated touch key device (e.g., a touch panel or a digitizer). The electric connection unit 205 may be used to electrically connect the PBA 3 and the non-illustrated button circuit or touch key circuit mounted to the display unit 2. The electric connection unit 205 may include, on one end thereof (not illustrated), a connector (e.g., a male or female connector) that can be connected to a connector of the PBA 3. The electric connection unit 205 may be implemented to be bendable and may be connected to a connector mounted on the lower surface (reference numeral 2 of FIG. 2) of the PBA 3. For example, the electric connection unit 205 may include a flexible printed circuit board (FPCB) or a cable.

The PBA 3 may be disposed between the display unit 2 and the device case 5. The PBA 3 may be mounted on the bracket (reference numeral 23 of FIG. 2) of the display unit 2.

According to an embodiment, the PBA 3 may include a plurality of removable circuit boards 3-1 and 3-2. For example, the PBA 3 may include the first circuit board 3-1 and the second circuit board 3-2 that are disposed on opposite sides of the electronic device 100, respectively. The first circuit board 3-1 may include a first connector 3-1C disposed in the peripheral area of the lower mounting part (reference numeral 233 of FIG. 2) of the bracket 23. The first connector 3-1C may protrude further than other portions of the first circuit board 3-1. In addition, the second circuit board 3-2 may include a second connector 3-2C disposed in the peripheral area of the lower mounting part (reference numeral 233 of FIG. 2) of the bracket 23. The second connector 3-2C may protrude further than other portions of the second circuit board 3-2. The first and second connectors 3-1C and 3-2C may be engaged with each other, and the first and second circuit boards 3-1 and 3-2 may be electrically connected to each other.

The PBA 3 may have a plurality of bolt holes 3-1H, 3-2H, 3-3H, 3-4H, 3-5H, 3-6H, 3-7H, and 3-8H formed therein. The plurality of bolt holes 3-1H, 3-2H, 3-3H, 3-4H, 3-5H, 3-6H, 3-7H, and 3-8H may be disposed to correspond to a plurality of bosses (not illustrated) of the bracket 23.

A plurality of bolts B1, B2, B3, B4, B5, and B6 may pass through the plurality of bolt holes 3-1H, 3-2H, 3-3H, 3-4H, 3-5H, and 3-6H and may be fastened to the plurality of bosses of the bracket 23 so that the PBA 3 and the bracket 23 may be coupled to each other.

The device case 5 may have bolt holes 4-7H and 4-8H formed therein. The bolt holes 4-7H and 4-8H may be disposed to correspond to bolt holes 3-7H and 3-8H of the PBA 3. Bolts B7 and B8 may pass through the bolt holes 4-7H and 4-8H of the device case 5 and the bolt holes 3-7H and 3-8H of the PBA 3 and may be fastened to the plurality of bosses of the bracket 23 so that the device case 5, the PBA 3, and the bracket 23 may be coupled together.

The device case 5 may be disposed below the PBA 3. An upper opening portion 520 of the device case 5 may include a portion where the display unit 2 is mounted.

The device case 5 may contain a conductive material. The conductive material may reduce the electrical noise of the electronic device 100. The conductive material may also diffuse heat released from a heating element (e.g., the PBA 3).

According to an embodiment, the device case 5 may include at least one non-conductive material. Particularly, at least a part of at least one antenna (in-molding antenna), which is not illustrated, may be disposed in the interior of the non-conductive material of the device case 5. A power feed terminal or a ground terminal of the at least one antenna may extend from a part of the device case 5 surrounded by the non-conductive material, and may be disposed on the upper surface (reference numeral 5-2S 1 of FIG. 2) of the device case 5. The power feed terminal or the ground terminal of the at least one antenna may be brought into physical contact with a power feed terminal (not illustrated) or a ground terminal (not illustrated) that is disposed on the lower surface (reference numeral 303 of FIG. 2) of the PBA 3. Here, the power feed terminal or the ground terminal of the PBA 3 may be a resilient contact type terminal. Alternatively, although not illustrated, the in-molding antenna may also be implemented in the bracket 3 or the cover 6.

The device case 5 may include a transparent window 516. For example, the transparent window 516 may be disposed to correspond to an optical electronic component (e.g., a camera module) disposed on the lower surface (reference numeral 303 of FIG. 2) of the PBA 3.

The battery pack 9 may be disposed in a battery pack mounting section (not illustrated) formed on the lower surface (reference numeral 5-2S3 of FIG. 2) of the device case 5.

The cover 6 may be disposed below the device case 5. The cover 6 may include a through hole 616 and a plurality of hooks 617. The through hole 616 may be disposed to correspond to the transparent window 516 of the device case 5. The plurality of hooks 617 may be disposed on the periphery 6-R of the cover 6. The plurality hooks 617 may be fastened to a plurality of hook fastening recesses (not illustrated) of the device case 5, and thus the cover 6 may be coupled to the device case 5.

The cover 6 may contain a conductive material. The conductive material may reduce electrical noise of the electronic device 100. The conductive material may also diffuse heat released from a heating element (e.g., the PBA 3).

The electronic device 100 may further include a circuit device, including an antenna (not illustrated) or a speaker (not illustrated), which is disposed between the second circuit board 3-2 and the device case 5. For example, a terminal (e.g., a resilient terminal) of the circuit device may be brought into electric contact with a terminal (not illustrated) disposed on the lower surface of the second circuit board 3-2. The circuit device may be shaped such that the antenna or the speaker is disposed on a plastic injection molded object.

Figure 4:
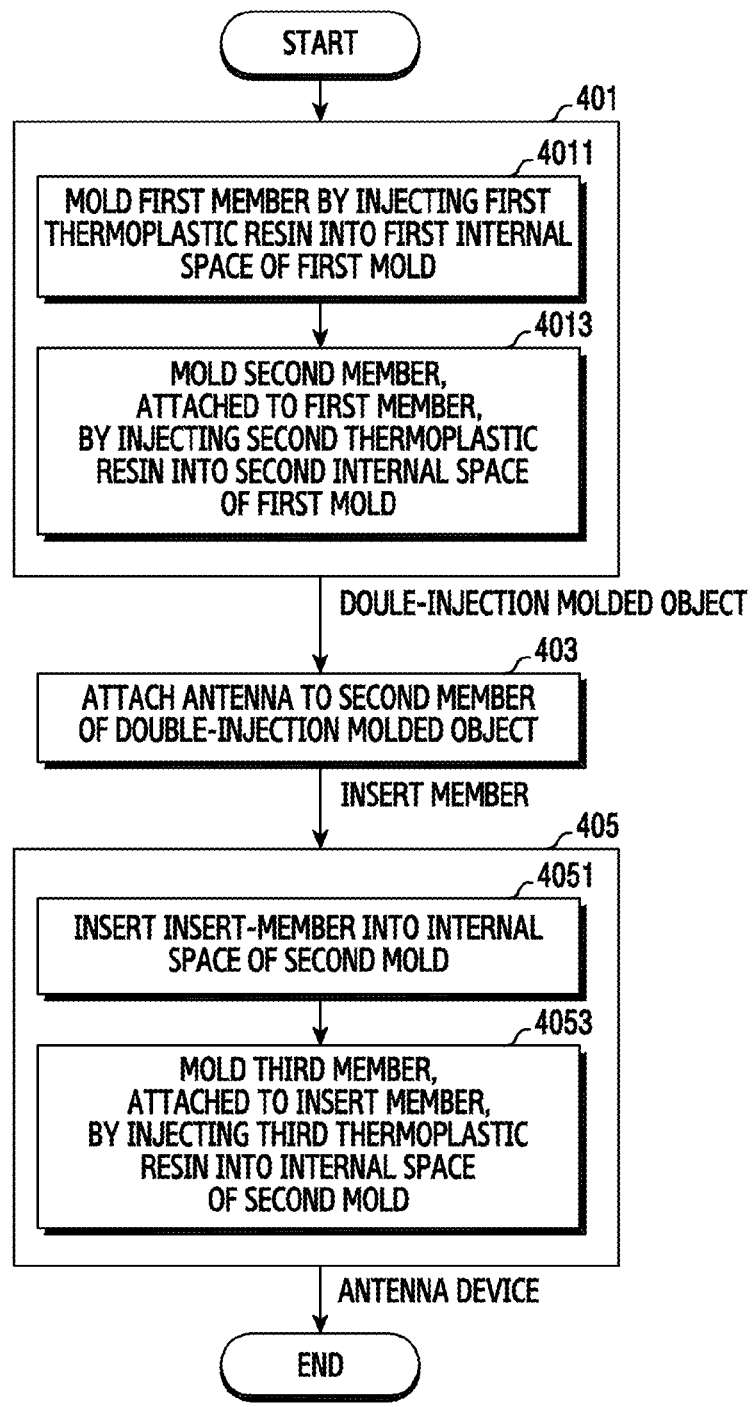
FIG. 4 is a flowchart illustrating an example procedure of manufacturing an antenna device according to an embodiment of the present disclosure.

FIG. 4 is a flowchart illustrating an example procedure of manufacturing an antenna device according to an embodiment of the present disclosure.

Referring to FIG. 4, a double injection molded object (or a base member) may be molded in step 401. For example, in step 4011, a first member may be molded by injecting a first thermoplastic resin into a first internal space of a first mold. Here, "injection molding using a thermoplastic resin" means a series of processes of melting a thermoplastic resin, injecting the molten thermoplastic resin into the internal space (forming space) of a mold, and cooling the mold to obtain a solid molded object. Thereafter, in step 4013, a second member attached to the first member may be molded by injecting a second thermoplastic resin into a second internal space of the first mold.

According to an embodiment, the second thermoplastic resin may have a higher melting temperature or heat-resistance temperature than the first thermoplastic resin. Accordingly, the second thermoplastic resin in a liquid phase may be coupled, attached, or bonded (e.g., thermally bonded or fused) to the first member while melting the surface of the first member. Since the second thermoplastic resin has a higher melting temperature or heat-resistance temperature than the first thermoplastic resin, the second member is preferably molded after the first member in order to increase a bonding force between the first and second members.

In step 403, an antenna may be attached to the second member of the double injection molded object (or base member). According to an embodiment, the antenna may be molded by (e.g., laser direct structuring (LDS)) radiating a laser beam and then performing plating. According to other embodiments, the antenna may also be molded using various methods, such as stenciling, printing, attaching, and the like. Here, the antenna and the double injection molded object, which are integrated with each other, may be referred to as an "insert member." The insert member indicates a member that is inserted into the internal space of a mold and covered with an injected thermoplastic resin while injection molding.

In step 405, the antenna device may be molded through insert molding. For example, in step 4051, the insert member may be inserted into the internal space of a second mold. Next, in step 4503, a third member (or cover member) attached to the insert member may be molded by injecting a third thermoplastic resin into the internal space of the second mold.

The third member (e.g., the device case 5) may cover at least one surface of the insert member. For example, the third member may cover at least one surface of the first member. Alternatively, the third member may cover at least one surface of the second member. Or, the third member may cover at least one surface of the antenna. According to an embodiment, at least a part of the antenna is not exposed by the third member. As described above, such a type of antenna may be referred to as an "in-molding antenna."

According to an embodiment, the third thermoplastic resin may have a melting temperature or heat-resistance temperature equal to or higher than that of the first thermoplastic resin. For example, the third thermoplastic resin may be the same material as the first thermoplastic resin. Accordingly, the third thermoplastic resin in a liquid phase may be attached to the first member while melting the surface of the first member of the insert member.

According to an embodiment, the second thermoplastic resin may have a higher melting temperature or heat-resistance temperature than the third thermoplastic resin. Accordingly, it may be difficult for the third thermoplastic resin in a liquid phase to melt the second thermoplastic resin. Alternatively, the second thermoplastic resin may have a thermal shock force so as not to be damaged by the heat of the third thermoplastic resin in a liquid phase. Consequently, the second member is less likely to be deformed by the heat of the third thermoplastic resin in a liquid phase, and the antenna attached to the second member may be in a stable state without deformation (e.g., deflection or torsion). The antenna is also preferably molded of a material that is not deformed by the heat of a thermoplastic resin in a liquid phase.

FIGS. 5A to 5D are views schematically illustrating an example procedure of manufacturing an antenna device according to an embodiment of the present disclosure.

Figure 5A:
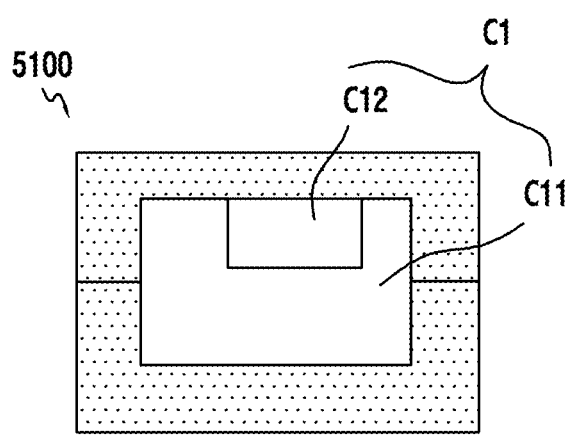
FIGS. 5A, 5B, 5C and 5D are views schematically illustrating an example procedure of manufacturing an antenna device according to an embodiment of the present disclosure.

Referring to FIG. 5A, the internal space C1 of a mold 5100 for double injection molding may include a first internal space C11 and a second internal space C12. Here, the "internal space" of the mold may mean a "molding space" that defines the shape of an injection molded object.

Figure 5B:
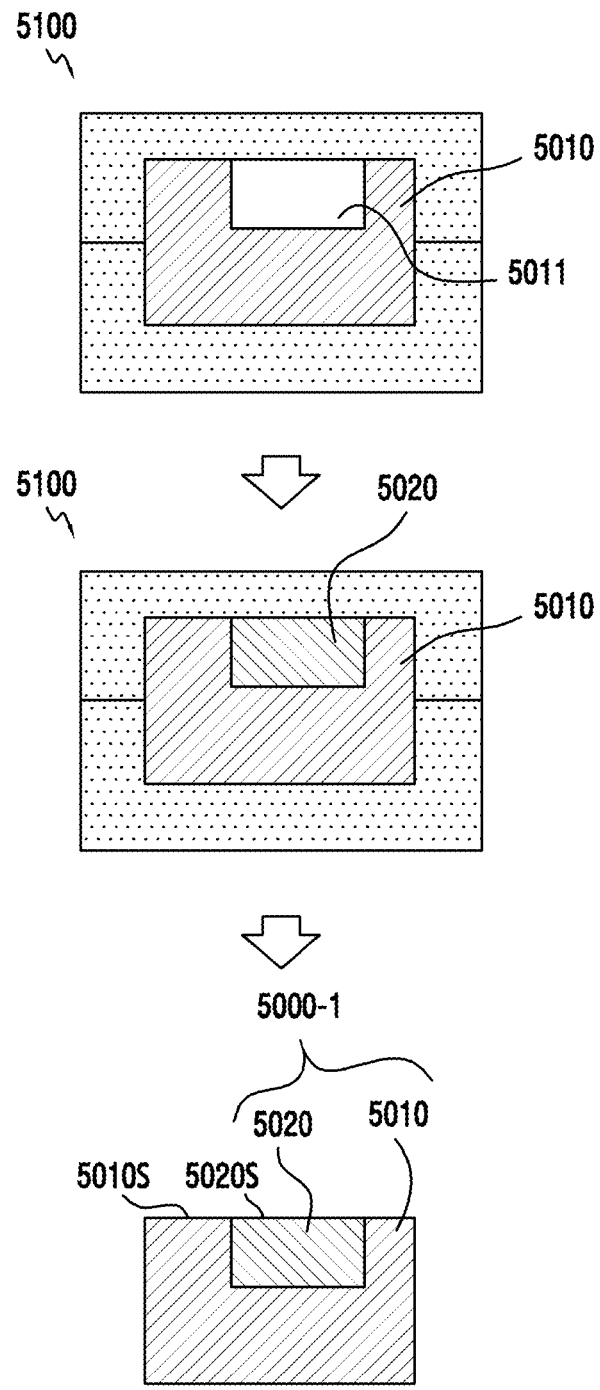

Referring to FIG. 5B, a first member 5010 may be molded by injecting a first thermoplastic resin (e.g., a laser direct structuring (LDS) resin) into the first internal space C11 of the mold 5100 for double injection molding. Here, the first member 5010 may include a recess 5011 disposed on one surface thereof. The space of the recess 5011 of the first member 5010 may occupy a portion of the second internal space C12. The recess 5011 of the first member 5010 may include a flat surface or curved surface.

A second member 5020 may be molded by injecting a second thermoplastic resin (e.g., a laser direct structuring (LDS) resin) into the second internal space C12 of the mold 5100 for double injection molding, and may be attached to the first member 5010 which has been molded in advance. As illustrated, a surface 5010S of the first member 5010 or a surface 5020S of the second member may include a flat surface, or may include a curved surface (not illustrated). Alternatively, the surface 5010S of the first member 5010 and the surface 5020S of the second member may be smoothly connected to each other as illustrated, or may not be smoothly connected to each other although not illustrated.

According to an embodiment, the second thermoplastic resin may have a higher melting temperature or heat-resistance temperature than the first thermoplastic resin. Accordingly, the second thermoplastic resin in a liquid phase may be coupled, attached, or bonded (e.g., thermally bonded or fused) to the first member while melting the surface of the first member. Here, the surface of the first member 5010 that contacts the second thermoplastic resin in a liquid phase may include a flat surface or a curved surface. The first and second members 5010 and 5020 molded through the mold 5100 for double injection molding may be referred to as a "double injection molded object 5000-1."

Figure 5C:
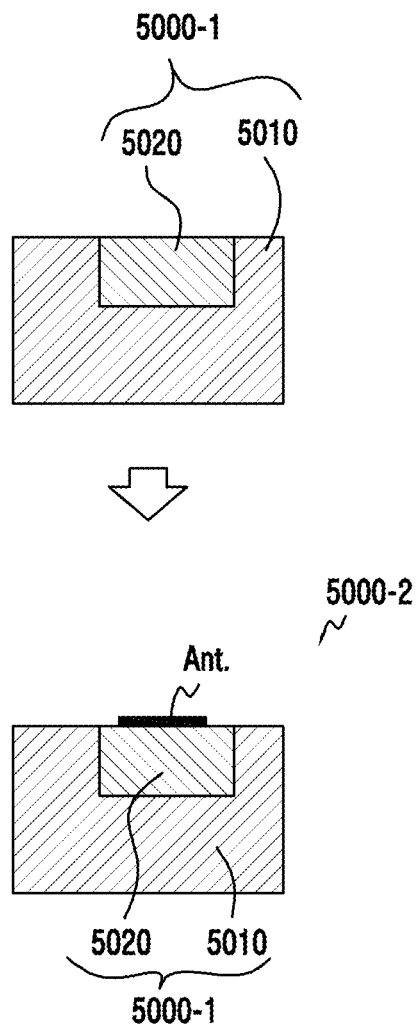

Referring to FIG. 5C, an antenna (Ant.) may be attached to the second member 5020 of the double injection molded object 5000-1. Here, the double injection molded object 5000-1 may be referred to as a "base member" or an "antenna carrier." At least one surface of the second member 5020 to which the antenna (Ant.) is attached may include a flat surface or a curved surface. Alternatively, the thickness of the antenna (Ant.) may or may not be uniform. Or, the antenna (Ant.) may include a flat surface or a curved surface. Since the antenna (Ant.) and the double injection molded object 5000-1 are inserted into the internal space of the mold for double injection molding, they may be referred to as an "insert member 5000-2."

Figure 5D:
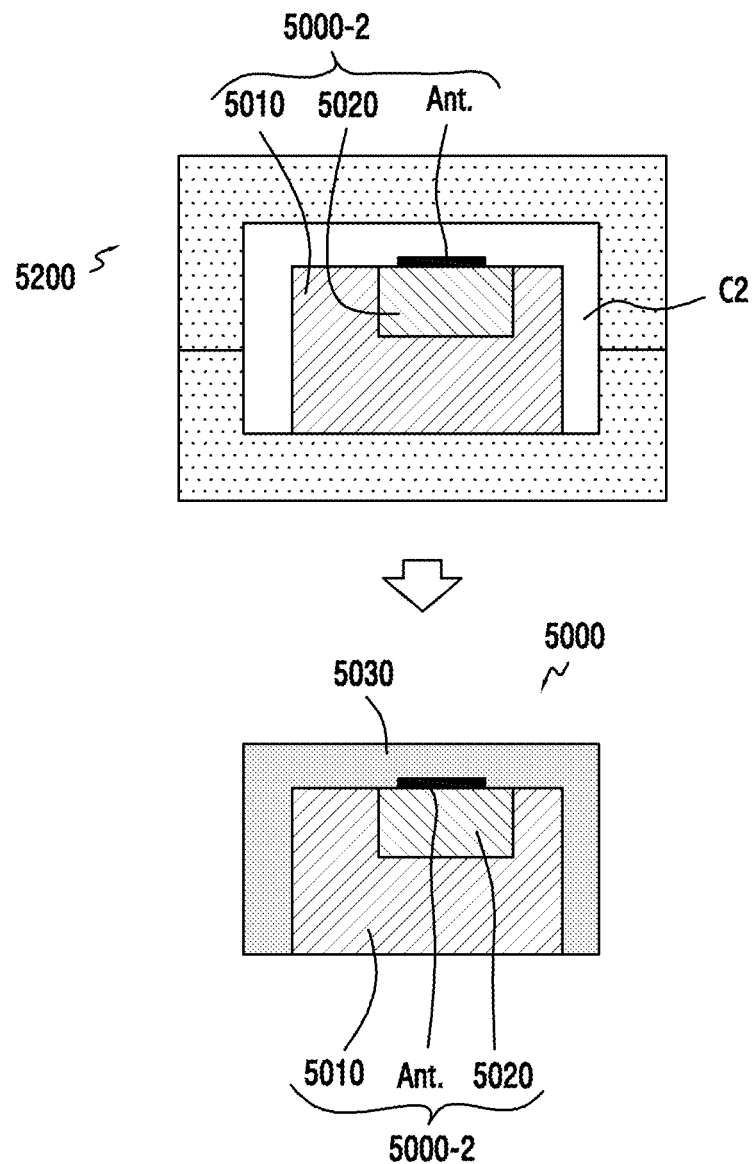

Referring to FIG. 5D, a third member 5030 (or a cover member) may be attached to the insert member 5000-2 using insert molding. For example, the insert member 5000-2 may be inserted into the internal space C2 of a mold 5200 for insert molding, and the third member 5030 may be molded by injecting a third thermoplastic resin (e.g., polycarbonate resin) in a liquid phase into the internal space C2 of the mold 5020 for insert molding.

Here, the third member 5030 may cover at least one surface of the insert member 5000-2. For example, the third member 5030 may cover at least one surface of the first member 5010. Alternatively, the third member 5030 may cover at least one surface of the second member 5020. Or, the third member 5030 may cover at least one surface of the antenna (Ant.). According to an embodiment, at least a part of the antenna (Ant.) may be disposed between the second and third members 5020 and 5030 so that it may not be exposed. As described above, such a type of antenna (Ant.) may be referred to as an "in-molding antenna."

According to an embodiment, the third thermoplastic resin may have a melting temperature or heat-resistance temperature equal to or higher than that of the first thermoplastic resin. For example, the third thermoplastic resin may contain the same material as the first thermoplastic resin. Accordingly, the third thermoplastic resin in a liquid phase may be attached to the first member 5010 while melting the surface of the first member 5010.

According to an embodiment, the second thermoplastic resin may have a higher melting temperature or heat-resistance temperature than the third thermoplastic resin of the third member 5030. Accordingly, it may be difficult for the third thermoplastic resin in a liquid phase to melt the second member 5020. Alternatively, the second thermoplastic resin may have a thermal shock force so as not to be damaged by the heat of the third thermoplastic resin in a liquid phase. Therefore, the third member 5030 is less likely to be deformed by the heat of the second thermoplastic resin in a liquid phase, and the antenna (Ant.) attached to the third member 5030 may be in a stable state.

Figure 6:
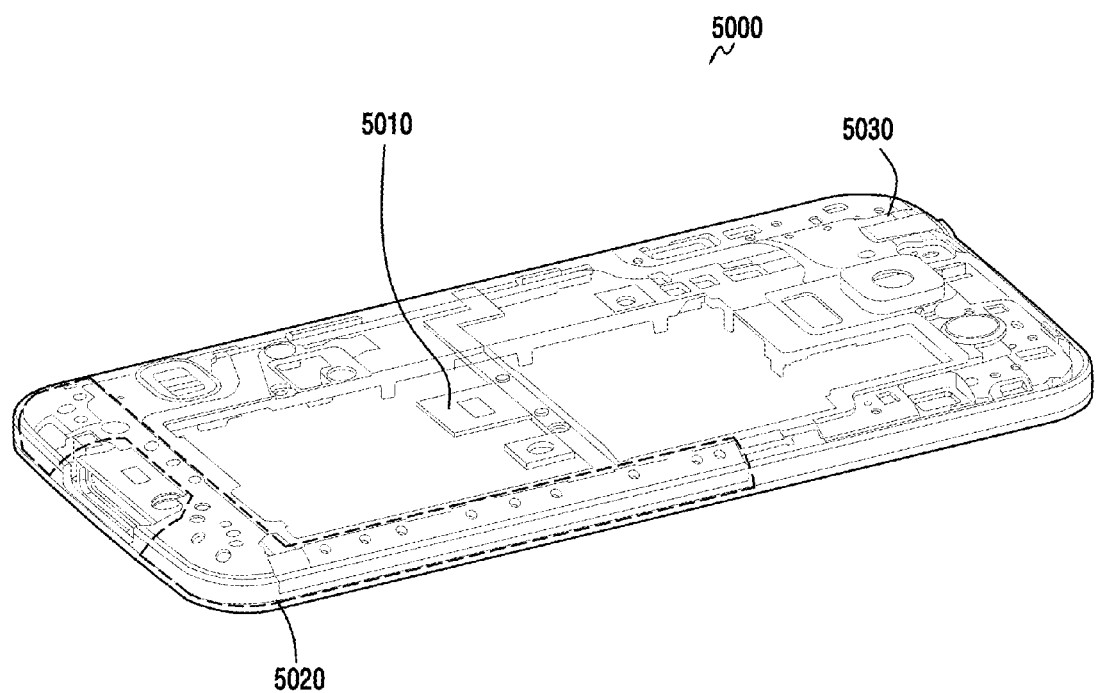
FIG. 6 illustrates an antenna device according to an example embodiment of the present disclosure.

FIG. 6 illustrates an example antenna device according to an embodiment of the present disclosure. Referring to FIG. 6, the antenna device 5000 may include a first member 5010, a second member 5020, and a third member 5030.

The second member 5020 (not exposed in practice) may be disposed between the first and third members 5010 and 5030. The first and second members 5010 and 5020 may be integrally molded through double injection molding. Here, after the first member 5010 is molded first using a first thermoplastic resin, the second member 5020 may be molded using a second thermoplastic resin that has a higher melting temperature than the first thermoplastic resin. An antenna (not illustrated) may be disposed on the second member 5020.

Here, since the second thermoplastic resin of the second member 5020 has a higher melting temperature than the third thermoplastic resin of the third member 5030, the third thermoplastic resin is less likely to be attached to the second member 5020 while insert molding, and accordingly, the third member 5030 is likely to be delaminated from the second member 5020. Therefore, a bonding range between the third thermoplastic resin and the first member 5010 may be expanded by minimizing the area where the second member 5020 is mounted.

A plurality of second members 5020 may be provided. The plurality of second members 5020 may be separated from each other (for example, the second members may be disposed on opposite corners as illustrated). The first and third members 5010 and 5030 may be coupled, attached, or bonded to each other between the plurality of second members 5020. This leads to the alleviation of torsion or shock applied to the antenna device 5000, thereby preventing the antenna attached to the second member 5020 from being deformed.

The third member 5030 (e.g., the device case 5) may be attached to the first and second members 5010 and 5020 through insert molding using the third thermoplastic resin. At least a part of the second member 5020 may be disposed between the first and third members 5010 and 5030. Further, at least a part of the antenna (Ant. of FIG. 5C) may be disposed between the second and third members 5020 and 5030. Here, the third thermoplastic resin of the third member 5030 may have a lower melting temperature than the second thermoplastic resin of the second member 5020. Alternatively, the third thermoplastic resin of the third member 5030 may have a melting temperature equal to or lower than that of the first thermoplastic resin of the first member 5010.

Figure 7:
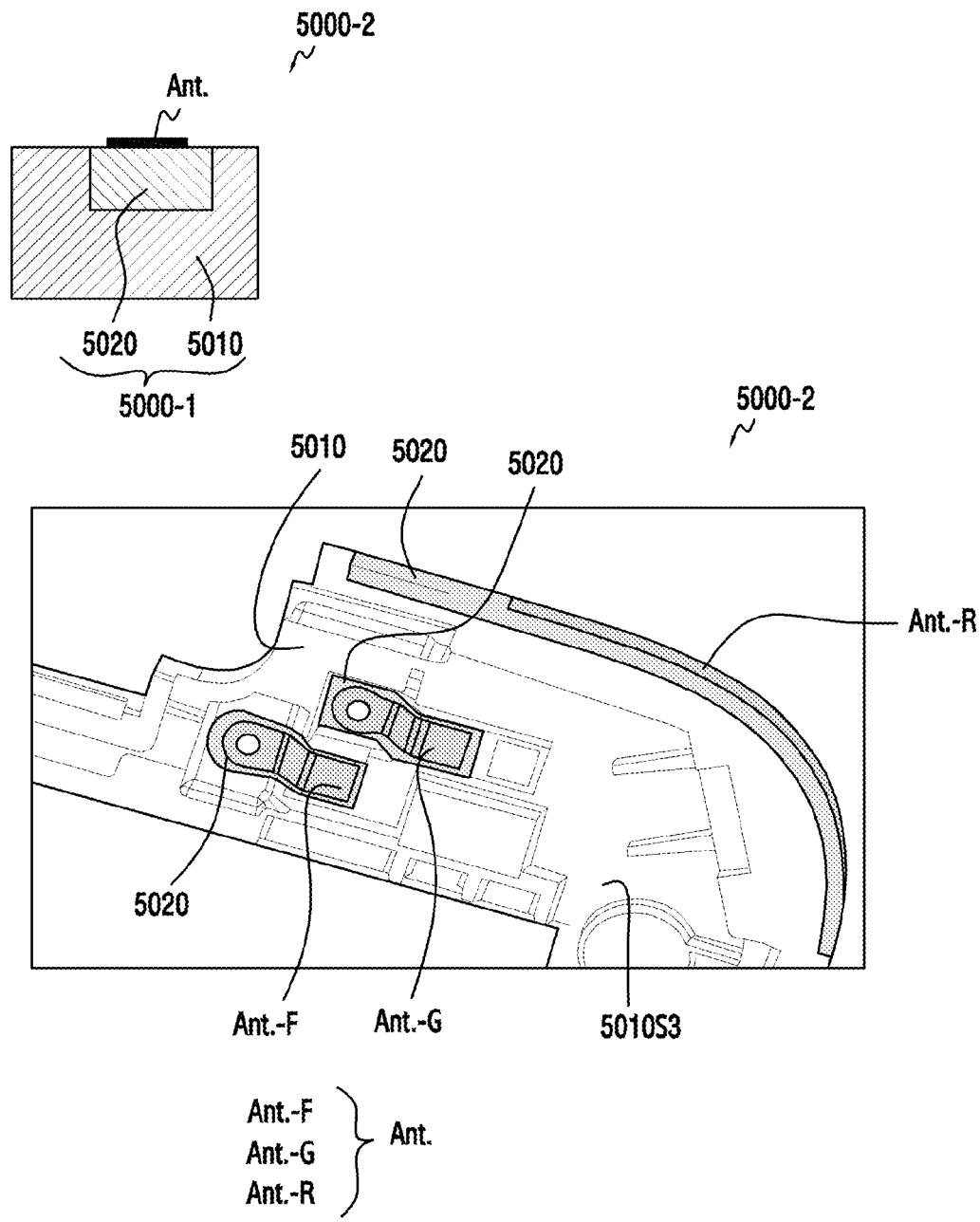
FIG. 7 illustrates an insert member according to an example embodiment of the present disclosure.

FIG. 7 illustrates an example insert member according to an embodiment of the present disclosure.

Referring to FIG. 7, the insert member 5000-2 may include a double injection molded object 5000-1 (or a base member) and an antenna (Ant.). The double injection molded object 5000-1 may include a first member 5010 and a second member 5020 that are molded using double injection molding. According to an embodiment, the second member 5020 may have a plate shape and may cover the surface of the first member 5010. A portion of the second member 5020 may be disposed near the periphery of the first member 5010 (e.g., at a location close to the side surface 1002 of the electronic device 100). Alternatively, although not illustrated, a portion of the second member 5020 may be disposed close to the upper surface of the electronic device 100. Or, a portion of the second member 5020 may be disposed on the surface 5010S3 of the first member 5010 facing the lower surface 303 of the PBA (reference numeral 3 of FIG. 3).

The antenna (Ant.) may be attached to at least a portion of the surface of the second member 5020. Accordingly, at least a part of the second member 5020 may be disposed between the antenna (Ant.) and the first member 5010.

The antenna (Ant.) may include a radiation part (Ant.-R), a power feed terminal (Ant.-F) and a ground terminal (Ant.-G). The radiation part (Ant.-R) may resonate at one or more frequencies. Here, the radiation part (Ant.-R) may be disposed near the periphery of the insert member 5000-2 (e.g., at a location close to the side surface 1002 of the electronic device 100). Alternatively, although not illustrated, the radiation part (Ant.-R) may be disposed close to the upper surface 1001 of the electronic device 100. The power feed terminal (Ant.-F) or the ground terminal (Ant.-G) may extend from the radiation part (Ant.-R) and may be disposed on the surface facing the lower surface 303 of the PBA (reference numeral 3 of FIG. 3). The power feed terminal (Ant.-F) may be connected to the power feed part of the PBA 3, and the ground terminal (Ant.-G) may be connected to the ground part of the PBA 3.

Figure 8:
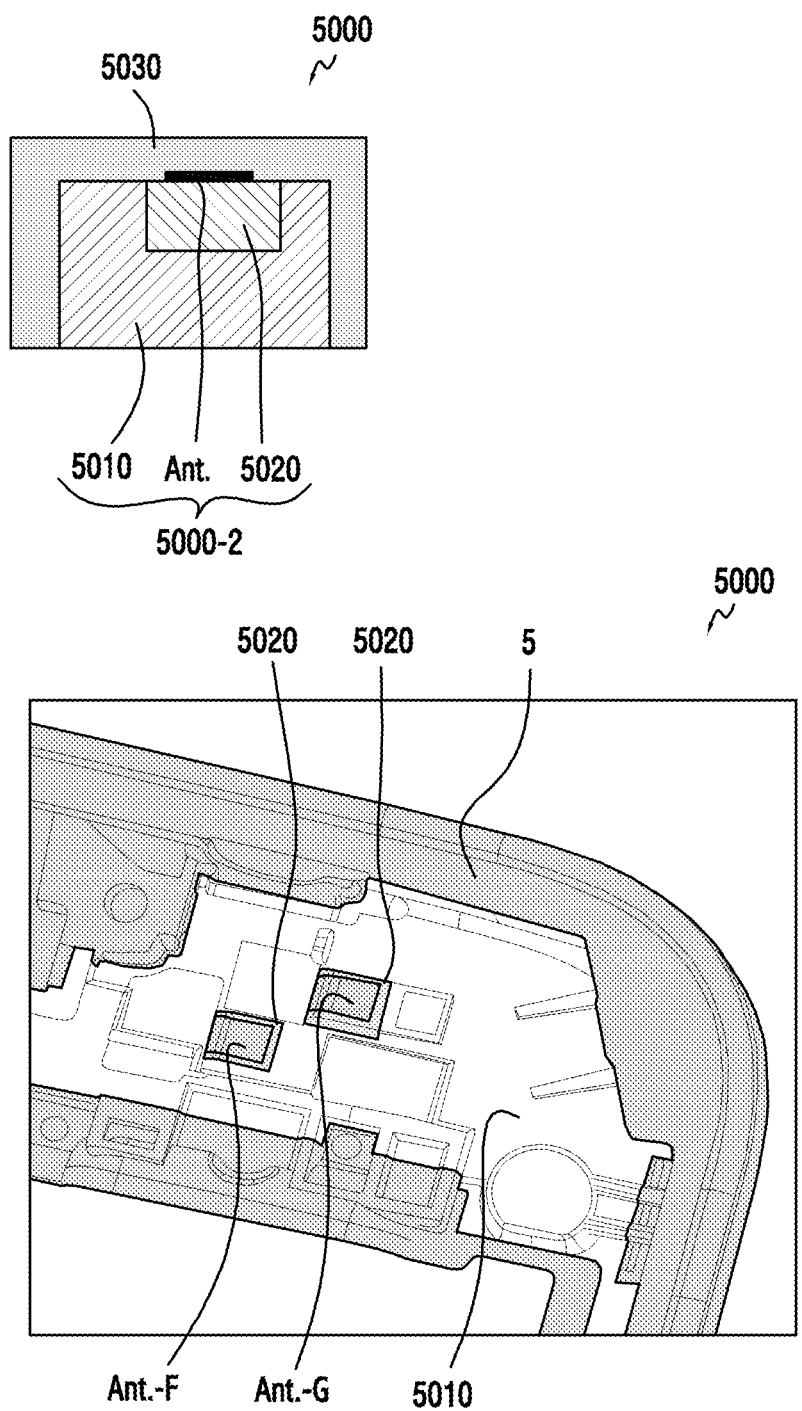
FIG. 8 illustrates an antenna device according to an example embodiment of the present disclosure.

FIG. 8 illustrates an example antenna device according to an embodiment of the present disclosure.

Referring to FIG. 8, the antenna device 5000 that includes a device case 5 attached to an insert member (reference numeral 5000-2 of FIG. 7) may be molded using a method (i.e., insert molding) of inserting the insert member 5000-2 into the internal space of a mold (reference numeral 5200 of FIG. 5D) and injecting a third thermoplastic resin into the internal space of the mold 5200. At least a part of the device case 5 (e.g., a third member 5030) may be coupled, attached, or bonded (e.g., thermally bonded or fused) to a first member 5010 of the insert member 5000-2. Here, the third thermoplastic resin of the device case 5 may have a melting temperature equal to or lower than that of the first thermoplastic resin of the first member 5010. Further, the device case 5 may cover at least a part of the antenna (Ant.). Here, the power feed terminal (Ant.-F) and the ground terminal (Ant.-G) of the antenna (Ant.) may be implemented to be exposed rather than to be covered with the device case 5.

Figure 9:
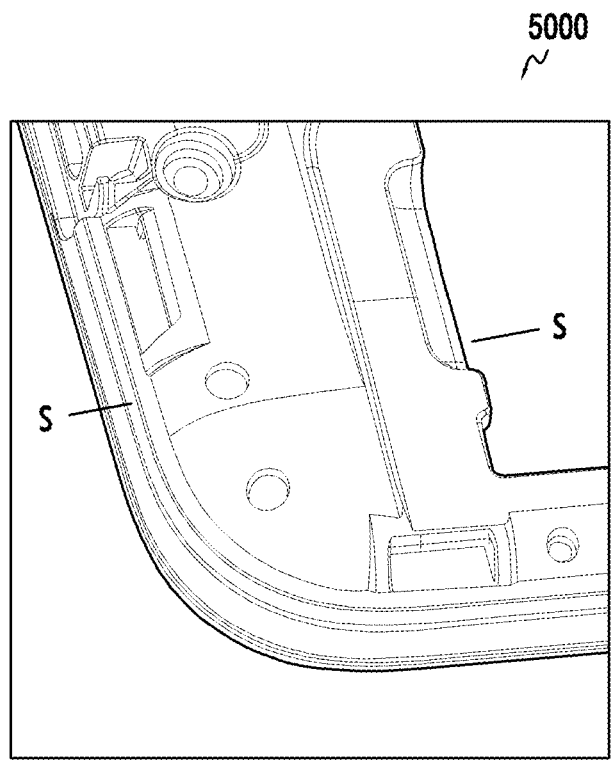
FIG. 9 illustrates an antenna device according to an example embodiment of the present disclosure.
Figure 9:
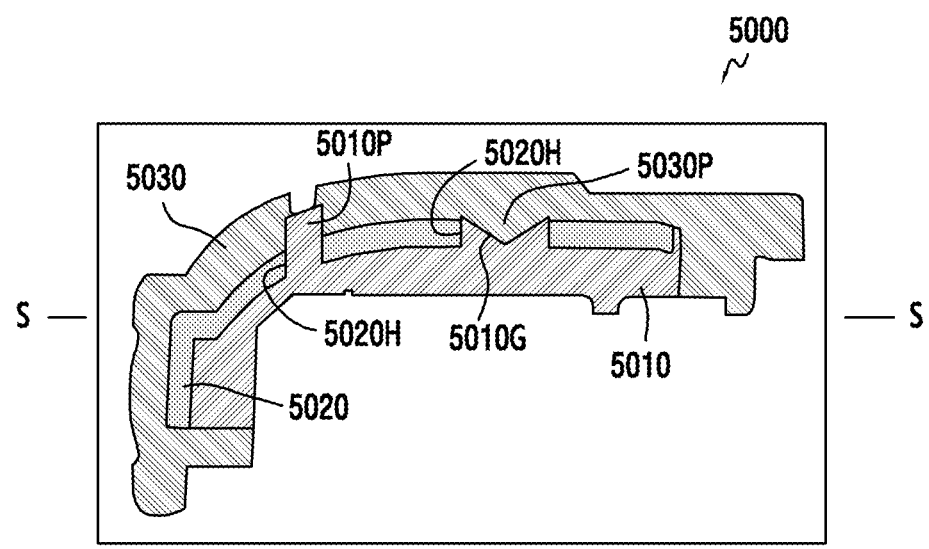

FIG. 9 illustrates an example antenna device according to an embodiment of the present disclosure.

Referring to FIG. 9, the antenna device 5000 may include a first member 5010, a second member 5020, and a third member 5030. The second member 5020 may be disposed in a space between the first and third members 5010 and 5030. Further, although not illustrated, an antenna (Ant.) may be attached to the second member 5020 and may be disposed between the second and third members 5020 and 5030.

According to an embodiment, the second member 5020 may have one or more through holes 5020H for coupling or bonding the first and third members 5010 and 5030. For example, the first member 5010 may include an extension 5010P that passes through at least one through hole 5020H of the second member 5020. The third member 5030 may be molded to be attached to the extension 5010P of the first member 5010.

For example, the first member 5010 may include a first bonding part 5010G that is disposed to correspond to at least one other through hole 5020H of the second member 5020. Here, the first bonding part 5010G may include a flat surface or a curved surface. The third member 5030 may include a second bonding part 5030P that is molded to be attached to the first bonding part 5010G of the first member 5010.

The extension 5010P and/or the first bonding part 5010G of the first member 5010 described above may increase a bonding range (or bonding area) between the first and third members 5010 and 5030, thereby increasing the coupling force between the first and third members 5010 and 5030. According to an embodiment, the first bonding part 5010G of the first member 5010 may have a recess shape (e.g., concave shape) as illustrated. Alternatively, although not illustrated, the first bonding part 5010G of the first member 5010 may also have a convex shape.

Figure 10:
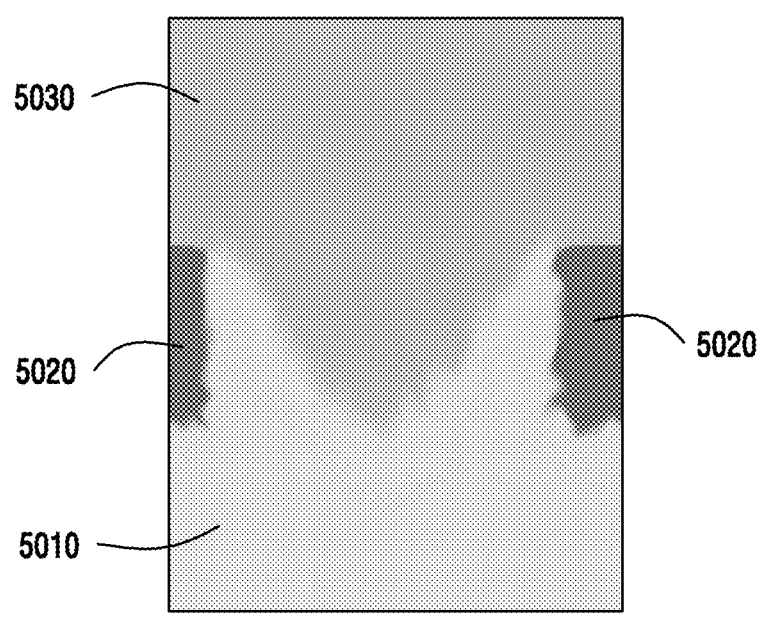
FIGS. 10, 11 and 12 illustrate bonding portions between first and third members, according to various example embodiments of the present disclosure.
Figure 11:
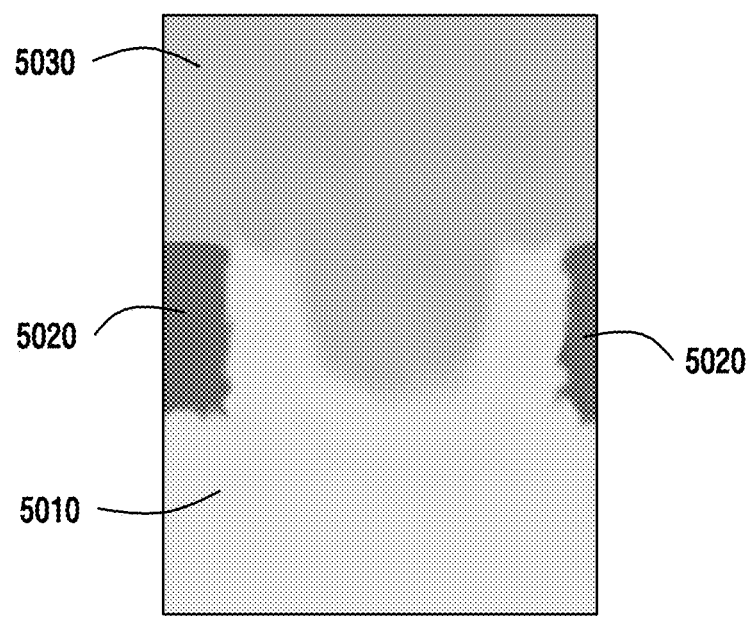
Figure 12:
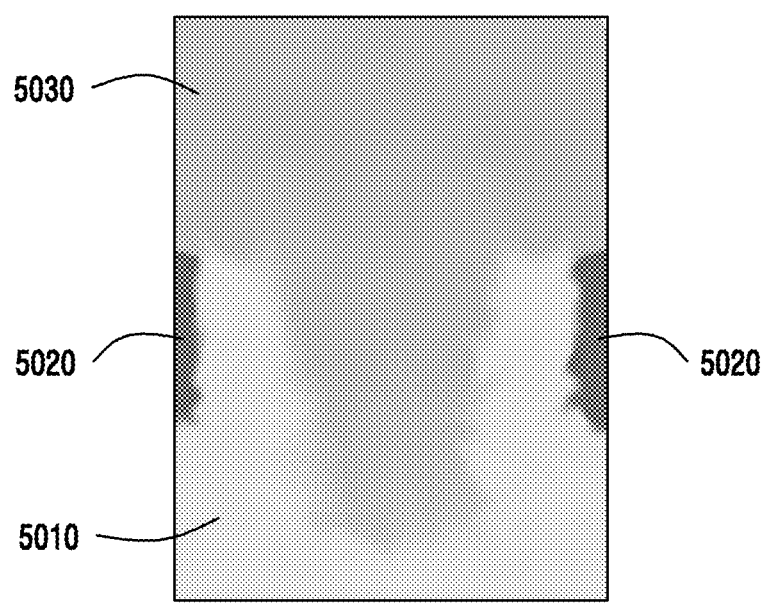

FIGS. 10 to 12 illustrate example bonding parts of first and third members, according to various embodiments of the present disclosure. As described above, the bonding parts of the first and third members 5010 and 5030 (the first bonding part 5010G and the second bonding part 5030P) may use the through hole 5020H of the second member 5020.

Referring to FIG. 10, bonding parts of the first and third members 5010 and 5030 may have a V-shaped section.

Alternatively, referring to FIG. 11, bonding parts of the first and third members 5010 and 5030 may have a U-shaped section.

In addition, referring to FIG. 12, bonding parts of the first and third members 5010 and 5030 may have various sections.

Figure 13:
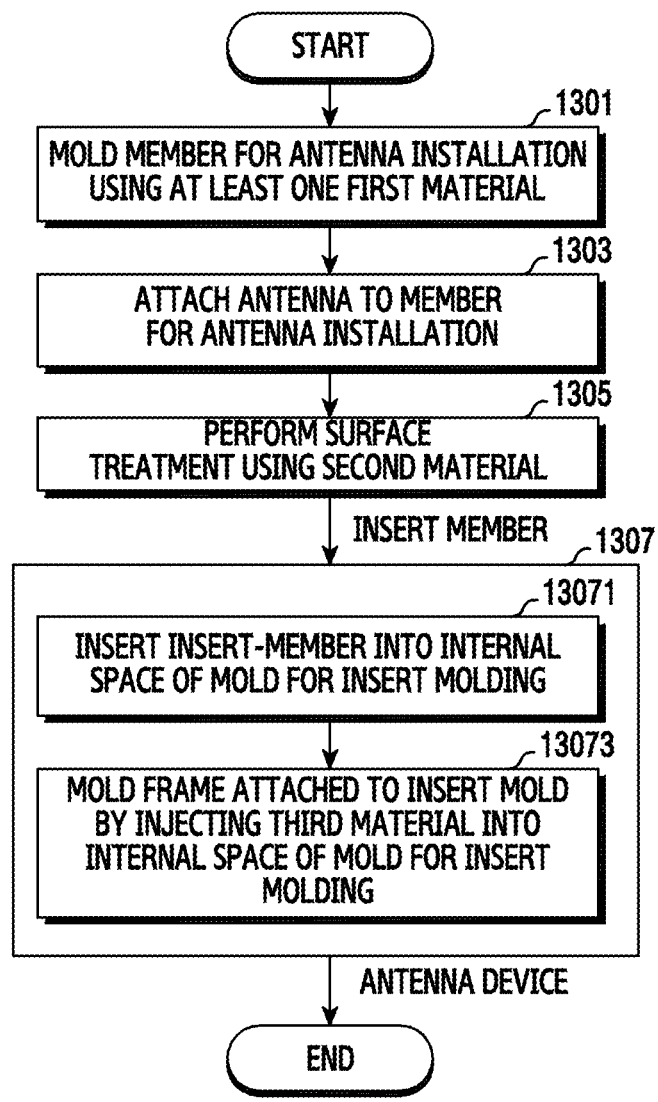
FIG. 13 is a flowchart illustrating an example procedure of manufacturing an antenna device according to another embodiment of the present disclosure.

FIG. 13 is a flowchart illustrating an example procedure of manufacturing an antenna device according to another embodiment of the present disclosure.

Referring to FIG. 13, in step 1301, a member (or a base member) for antenna installation may be molded using at least one first material. According to an embodiment, the member for antenna installation may be molded by injecting one thermoplastic resin into the internal space of a mold. According to another embodiment, the member for antenna installation may also be molded in the shape in which members made of different materials are coupled to each other using double injection molding.

In step 1303, an antenna may be attached to the member (or base member) for antenna installation. According to an embodiment, the antenna may be formed by radiating a laser beam and then performing plating. According to other embodiments, the antenna may also be formed using various methods, such as stenciling, printing, attaching, and the like.

In step 1305, the member for antenna installation to which the antenna is attached may be surface-treated using a second material (post-processing). The surface-treated layer may cover at least one surface of the member for antenna installation. Alternatively, the surface-treated layer may cover at least one surface of the antenna. Accordingly, an insert member (a member inserted into the internal space of a mold for insert molding while insert molding) may be molded. For example, the surface-treated layer may be attached to at least one surface of the member for antenna installation. Alternatively, the surface-treated layer may be attached to at least one surface of the antenna.

In step 1307, an antenna device may be molded through insert molding. For example, in step 13071, the insert member may be inserted into the internal space of the mold for insert molding. In step 13073, a frame (or cover member) (e.g., the device case 5) attached to the insert member may be molded by injecting a third material into the internal space of the mold for insert molding. Here, the frame may cover at least one surface of the insert member. For example, the frame may be attached to at least one surface of the member for antenna installation. Alternatively, the frame may be attached to at least one surface of the surface-treated layer. Or, the frame may be attached to at least one surface of the antenna.

Therefore, at least a part of the antenna may be disposed between the member for antenna installation and the frame (or cover member) and thus may not be exposed, and the antenna may be an in-molding antenna described above.

According to an embodiment, the at least one first material may have a higher melting temperature or heat-resistance temperature than the third material. Accordingly, the at least one first material is less likely to be deformed by heat of the third material in a liquid phase while insert molding, and the antenna attached to the at least one first member may be in a stable state without deformation (e.g., deflection or torsion).

According to an embodiment, the third material may have a melting temperature or heat-resistance temperature equal to or higher than that of the second material. For example, the third and second materials may be identical to each other. Accordingly, while insert molding, the third material in a liquid phase may be coupled, attached, or bonded to the surface-treated layer while melting the surface-treated layer made of the second material. Therefore, the frame may be attached to the member for antenna installation, to which the antenna is attached, by the surface-treated layer.

Figure 14A:
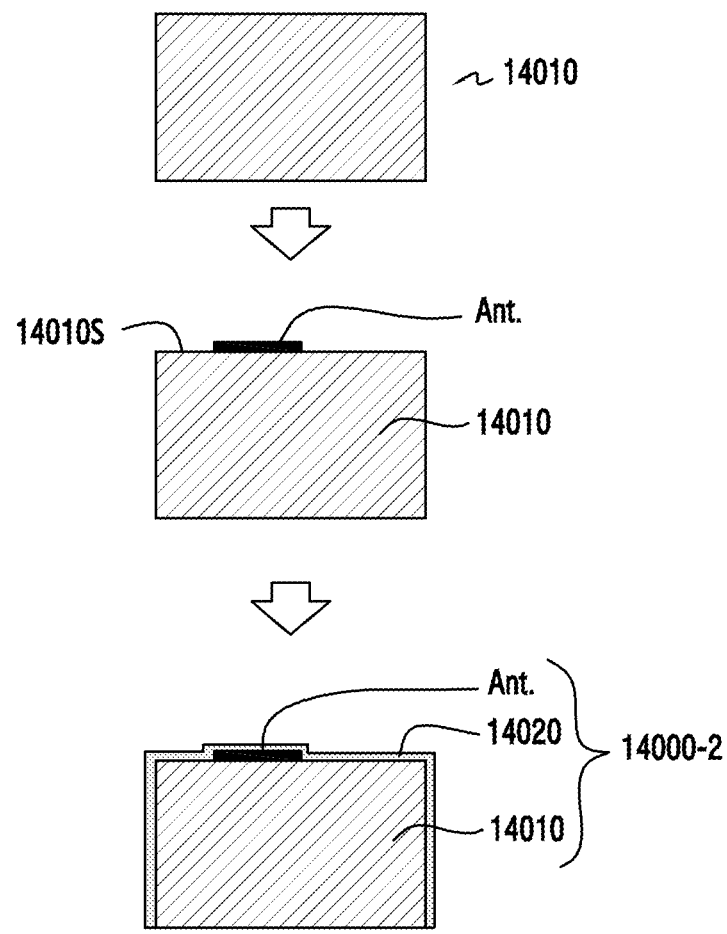
FIGS. 14A and 14B are views schematically illustrating an example procedure of manufacturing an antenna device according to another embodiment of the present disclosure.
Figure 14B:
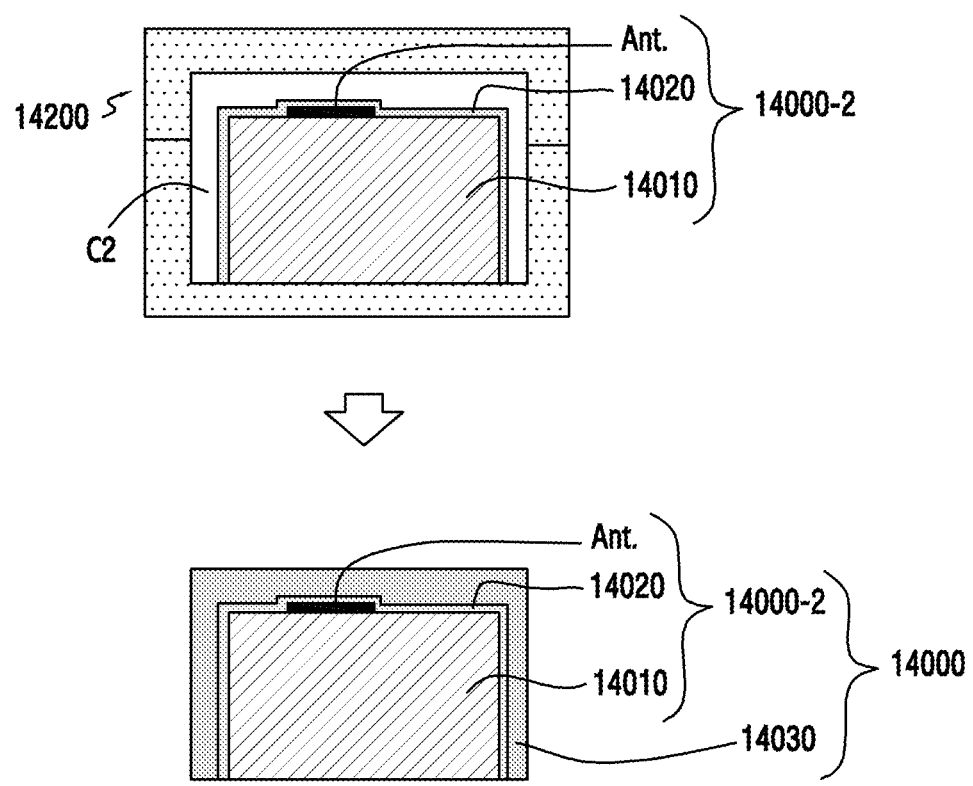

FIGS. 14A and 14B are views schematically illustrating an example procedure of manufacturing an antenna device according to another embodiment of the present disclosure.

Referring to FIG. 14A, a member 14010 (or base member) for antenna installation may be molded using at least one first material. According to an embodiment, the member 14010 for antenna installation may be molded by injecting one thermoplastic resin into the internal space of a mold. According to another embodiment, the member 14010 for antenna installation may also be molded in a shape in which members made of different materials are coupled to each other using double injection molding (e.g., the double injection molded object 5000-1 of FIG. 5B).

Further, the antenna (Ant.) may be attached to at least one surface 14010S of the member 14010 for antenna installation. The at least one surface of the member 14010 for antenna installation to which the antenna (Ant.) is attached may include a flat surface or a curved surface (not illustrated). The thickness of the antenna (Ant.) may or may not be uniform. The antenna (Ant.) may include a flat surface or a curved surface.

The at least one surface (e.g., flat surface or curved surface) of the member 14010 for antenna installation to which the antenna (Ant.) is attached may be surface-treated using a second material. For example, the surface-treated layer 14020 may be attached to the at least one surface 14010S of the member 14010 for antenna installation. Or, the surface-treated layer 14020 may be attached to at least one surface of the antenna (Ant.). The surface-treated layer 14020 may have a uniform or non-uniform thickness. The surface-treated layer 14020 may include a flat surface or a curved surface (not illustrated). Accordingly, an insert member 14000-2 (a member inserted into the internal space of a mold for insert molding while insert molding) may be molded.

Referring to FIG. 14B, a frame 14030 (or cover member) (e.g., the device case 5) may be molded by inserting the insert member 14000-2 into the internal space C2 of the mold 14200 for insert molding and then injecting a third material into the internal space C2 of the mold 14200 for insert molding. The frame 14030 may cover at least one surface of the insert member 14000-2.

According to an embodiment, the at least one first material may have a higher melting temperature or heat-resistance temperature than the third material. Accordingly, the member 14010 for antenna installation, which is molded of the first material, is less likely to be deformed by heat of the third material in a liquid phase while insert molding, and the antenna (Ant.) attached to the member 14010 for antenna installation may be in a stable state without deformation (e.g., deflection or torsion).

Further, the third material may have a melting temperature or heat-resistance temperature equal to or higher than that of the second material. Accordingly, while insert molding, the third material in a liquid phase may be attached to the surface-treated layer 14020 while melting the surface-treated layer 14020 made of the second material. If the surface-treated layer 14020 does not exist, since the first material has a higher melting temperature than the third material, the third material in a liquid phase is less likely to be attached to the surface of the member 14010 for antenna installation, which is made of the first material, while insert molding, and for this reason, the surface-treated layer 14020 made of the second material may be necessary.

According to a non-limiting example embodiment of the present disclosure, an antenna device 5000 may include a base member (e.g., double injection molded object 5000-1), an antenna (Ant.) that is attached to the base member 5000-1, and a cover member (e.g., third member 5030) that is attached to surround at least a part of the base member 5000-1 and at least a part of the antenna (Ant.). Here, a first part (e.g., first member 5010) of the base member 5000-1 that is attached to the cover member 5030 may have a melting temperature equal to or lower than that of the cover member 5030. Further, a second part (e.g., second member 5020) of the base member 5030 to which the antenna (Ant.) is attached may have a higher melting temperature than the cover member 5030.

According to a non-limiting example embodiment of the present disclosure, the second part (e.g., second member 5020) may be molded to be coupled to the first part 5010 after the first part (e.g., first member 5010) is molded.

According to a non-limiting example embodiment of the present disclosure, the first part (e.g., first member 5010) and the second part (e.g., second member 5020) may be molded using double injection molding.

According to a non-limiting example embodiment of the present disclosure, the first part (e.g., first member 5010) may include a flat surface or a curved surface.

According to a non-limiting example embodiment of the present disclosure, the first part (e.g., first member 5010) may be coupled to the cover member (e.g., third member 5030) through at least one through hole 5020H formed in the second part (e.g., second member 5020).

According to a non-limiting example embodiment of the present disclosure, the antenna (Ant.) may be attached to the second part (e.g., second member 5020) using one of laser direct structuring (LDS), stenciling, printing, and attaching.

According to a non-limiting example embodiment of the present disclosure, the cover member (e.g., third member 5030) may be molded to be attached to the antenna (Ant.) and the base member (e.g., double injection molded object 5000-1), which are integrated with each other, by using insert molding.

According to a non-limiting example embodiment of the present disclosure, the cover member (e.g., third member 5030) may include at least a part of a housing (e.g., device case 5) that forms an external appearance of an electronic device 100.

According to another non-limiting example embodiment of the present disclosure, an antenna device 14000 may include a base member (e.g., member 14010 for antenna installation), an antenna (Ant.) that is attached to the base member 14010, a surface-treated layer 14020 for coating at least a part of the base member 14010 or at least a part of the antenna (Ant.), and a cover member (e.g., frame 14030) that is attached to the surface-treated layer 14020. Here, the base member 14010 may have a higher melting temperature than the cover member 14030. Further, the cover member 14030 may have a melting temperature equal to or higher than that of the surface-treated layer 14020.

According to another non-limiting example embodiment of the present disclosure, the base member (e.g., member 14010 for antenna installation) may be molded of a single material.

According to another non-limiting example embodiment of the present disclosure, the base member (e.g., member 14010 for antenna installation) may include a plurality of parts (e.g., first member 5010 and second member 5020) made of different materials.

According to another non-limiting example embodiment of the present disclosure, the antenna (Ant.) may be attached to a part (e.g., second member 5020) that has the highest melting temperature among the plurality of parts of the base member (e.g., member 14010 for antenna installation).

According to another non-limiting example embodiment of the present disclosure, the plurality of parts (e.g., first member 5010 and second member 5020) of the base member (e.g., member 14010 for antenna installation) may be molded through double injection molding.

According to another non-limiting example embodiment of the present disclosure, the antenna (Ant.) may be attached to the base member using one of LDS, stenciling, printing, and attaching.

According to another non-limiting example embodiment of the present disclosure, the cover member (e.g., frame 14030) may be molded to be attached to the surface-treated layer 14020 using insert molding.

According to a non-limiting example embodiment of the present disclosure, the cover member (e.g., frame 14030) may include at least a part of a housing (e.g., device case 5) that forms an external appearance of an electronic device 100.

According to a non-limiting example embodiment of the present disclosure, a method of manufacturing an antenna device may include a step (e.g., step 401) of molding a base member (e.g., double injection molded object 5000-1), a step (e.g., step 403) of attaching an antenna (Ant.) to the base member 5000-1, and a step (e.g., step 405) of molding a cover member (e.g., third member 5030) that is attached to surround at least a part of the base member 5000-1 and at least a part of the antenna (Ant.). Here, a first part (e.g., first member 5010) of the base member 5000-1 that is attached to the cover member 5030 may have a melting temperature equal to or lower than that of the cover member 5030. Further, a second part (e.g., second member 5020) of the base member 5000-1 to which the antenna (Ant.) is attached may have a higher melting temperature than the cover member 5030.

According to another non-limiting example embodiment of the present disclosure, a method of manufacturing an antenna device may include a step (e.g., step 1301) of molding a base member (e.g., member 14010 for antenna installation), a step (e.g., step 1303) of attaching an antenna (Ant.) to the base member 14010, a step (e.g., step 1305) of molding a surface-treated layer 14020 for coating at least a part of the base member 14010 or at least a part of the antenna (Ant.), and a step (e.g., step 1307) of molding a cover member (e.g., frame 14030) that is attached to the surface-treated layer 14020. Here, the base member 14010 may have a higher melting temperature than the cover member 14030. Further, the cover member 14030 may have a melting temperature equal to or higher than that of the surface-treated layer 14020.

Figure 15:
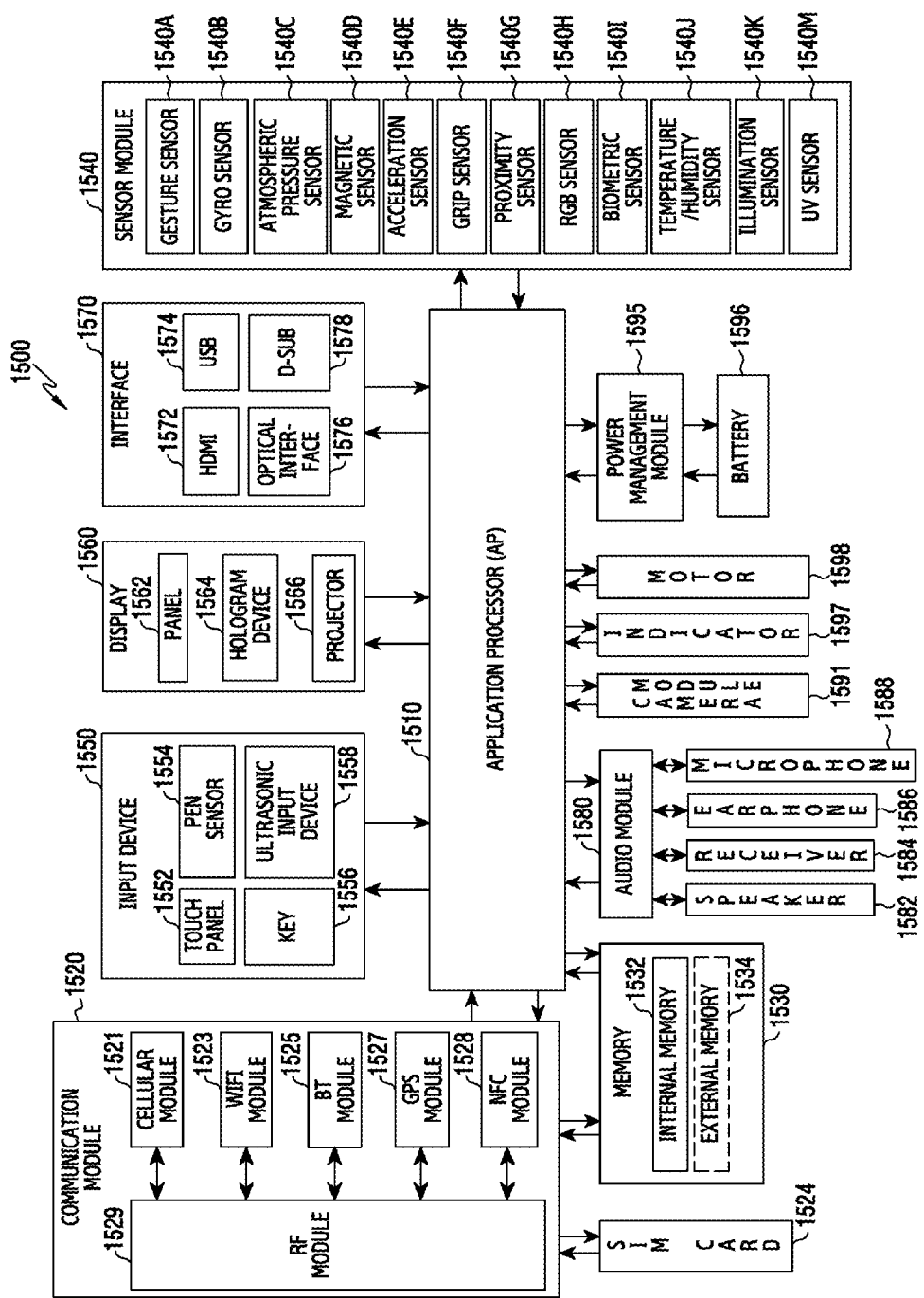
FIG. 15 is a block diagram of an example electronic device according to an embodiment of the present disclosure.

FIG. 15 is a block diagram of an example electronic device according to an embodiment of the present disclosure. The electronic device 1500 may constitute, for example, the entirety or a part of the electronic device 100 illustrated in FIG. 1. Referring to FIG. 15, the electronic device 1500 may include at least one Application Processor (AP) 1510, a communication module 1520, a subscriber identification module (SIM) card 1524, a memory 1530, a sensor module 1540, an input device 1550, a display 1560, an interface 1570, an audio module 1580, a camera module 1591, a power management module 1595, a battery 1596, an indicator 1597, and a motor 1598.

The AP 1510 may drive an operation system or an application program to control a plurality of hardware or software components connected to the AP 1510, and may perform data processing and operations on various types of data including multimedia data. The AP 1510 may be embodied as, for example, a System on Chip (SoC). According to an embodiment, the AP 1510 may further include a graphic processing unit (GPU) (not illustrated).

The communication module 1520 may transmit/receive data in communication between the electronic device 1500 and other electronic devices connected thereto through a network. According to an embodiment, the communication module 1520 may include a cellular module 1521, a WiFi module 1523, a Bluetooth (BT) module 1525, a global positioning system (GPS) module 1527, a near field communication (NFC) module 1528, and a radio frequency (RF) module 1529. The communication module 1520 may use the above-described antenna device 5000 or 14000.

The cellular module 1521 may provide a voice call, a video call, a short message service (SMS), or an Internet service through a communication network (e.g., LTE, LTE-A, CDMA, WCDMA, UMTS, WiBro, or GSM). Further, the cellular module 1521 may distinguish between and authenticate electronic devices in a communication network using, for example, a subscriber identification module (e.g., the SIM card 1524). According to an embodiment, the cellular module 1521 may perform at least some of the functions that the AP 1510 may provide. For example, the cellular module 1521 may perform at least some of the multimedia control functions.

According to an embodiment, the cellular module 1521 may include a communication processor (CP). Further, the cellular module 1521 may be embodied as, for example, an SoC. Although the components such as the cellular module 1521 (e.g., the communication processor), the memory 1530, or the power management module 1595 are illustrated as components separated from the AP 1510, the AP 1510 may include at least some of the above-described components (e.g., the cellular module 1521) according to an embodiment.

According to an embodiment, the AP 1510 or the cellular module 1521 (e.g., the communication processor) may load a command or data received from at least one of a non-volatile memory and other components connected thereto to a volatile memory, and may process the loaded command or data. Further, the AP 1510 or the cellular module 1521 may store data received from or generated by at least one of the other components in a non-volatile memory.

For example, the WiFi module 1523, the BT module 1525, the GPS module 1527, and the NFC module 1528 may include a processor for processing data transmitted/received through the corresponding module. Although the cellular module 1521, the WiFi module 1523, the BT module 1525, the GPS module 1527, and the NFC module 1528 are shown as separate blocks in FIG. 15, at least some (e.g., two or more) of the cellular module 1521, the WiFi module 1523, the BT module 1525, the GPS module 1527, and the NFC module 1528 may be included in one integrated chip (IC) or IC package according to an embodiment. For example, at least some of the processors corresponding to the cellular module 1521, the WiFi module 1523, the BT module 1525, the GPS module 1527, and the NFC module 1528 (e.g., the communication processor corresponding to the cellular module 1521 and the WiFi processor corresponding to the WiFi module 1523) may be implemented as one SoC.

The RF module 1529 may transmit and receive data, for example, RF signals. Although not illustrated, the RF module 1529 may include, for example, a transceiver, a power amp module (PAM), a frequency filter, and a low noise amplifier (LNA). In addition, the RF module 1529 may further include an element, for example, a conductor, a conducting wire, or the like, for transmitting/receiving electromagnetic waves over free air space in wireless communication. Although the cellular module 1521, the WiFi module 1523, the BT module 1525, the GPS module 1527, and the NFC module 1528 are illustrated to share one RF module 1529 in FIG. 15, at least one of the cellular module 1521, the WiFi module 1523, the BT module 1525, the GPS module 1527, and the NFC module 1528 may transmit/receive the RF signal through a separate RF module according to an embodiment of the present disclosure.

The SIM card 1524 may be a card that includes a subscriber identification module and may be inserted into a slot formed in a predetermined location of the electronic device. The SIM card 1524 may include unique identification information (e.g., an integrated circuit card identifier (ICCID)) or unique subscriber information (e.g., an international mobile subscriber identity (IMSI)).

The memory 1530 may include an internal memory 1532 or an external memory 1534. The internal memory 1532 may include at least one of a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

According to an embodiment, the internal memory 1532 may be a Solid State Drive (SSD). The external memory 1534 may further include a flash drive, for example, a compact flash (CF), a secure digital (SD), a micro secure digital (Micro-SD), a mini secure digital (Mini-SD), an extreme digital (xD), a Memory Stick, or the like. The external memory 1534 may be functionally connected to the electronic device 1500 through various interfaces. According to an embodiment, the electronic device 1500 may further include a storage device (or storage medium) such as a hard disc drive.

The sensor module 1540 may measure a physical quantity or sense an operational state of the electronic device 1500 and may convert the measured or sensed information to an electric signal. The sensor module 1540 may include at least one of, for example, a gesture sensor 1540A, a gyro sensor 1540B, an atmospheric pressure sensor 1540C, a magnetic sensor 1540D, an acceleration sensor 1540E, a grip sensor 1540F, a proximity sensor 1540G, a color sensor 1540H (e.g., a red/green/blue (RGB) sensor), a biometric sensor 1540I, a temperature/humidity sensor 1540J, an illumination sensor 1540K, and an ultraviolet (UV) sensor 1540M. Additionally or alternatively, the sensor module 1540 may, for example, include an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), an iris sensor (not illustrated), a fingerprint sensor (not illustrated), and the like. The sensor module 1540 may further include a control circuit for controlling one or more sensors included therein.

The input device 1550 may include a touch panel 1552, a (digital) pen sensor 1554, a key 1556, or an ultrasonic input device 1558. The touch panel 1552 may recognize a touch input in at least one of, for example, a capacitive type, a resistive type, an infrared type, and an acoustic wave type. Further, the touch panel 1552 may further include a control circuit. A capacitive touch panel may recognize a physical contact or proximity. The touch panel 1552 may further include a tactile layer. In this case, the touch panel 1552 may provide a tactile reaction to a user.

The (digital) pen sensor 1554 may be implemented, for example, using a method that is the same as or similar to a method of receiving a touch input of a user, or using a separate recognition sheet. The key 1556 may include, for example, a physical button, an optical key, or a keypad. The ultrasonic input device 1558 is a device that may identify data by detecting an acoustic wave through a microphone (e.g., a microphone 1588) in the electronic device 1500 through an input tool generating an ultrasonic signal, and may perform wireless recognition. According to an embodiment, the electronic device 1500 may also receive a user input from an external device (e.g., a computer or server) connected thereto using the communication module 1520.

The display 1560 (e.g., the display 150) may include a panel 1562, a hologram device 1564, or a projector 1566. For example, the panel 1562 may be, for example, a liquid crystal display (LCD), an active matrix organic light emitting diode (AM-OLED), or the like. The panel 1562 may be implemented to be, for example, flexible, transparent, or wearable. The panel 1562 and the touch panel 1552 may be implemented as one module. The hologram 1564 may display a three dimensional image in the air by using an interference of light. The projector 1566 may display an image by projecting light onto a screen. The screen may be located, for example, in the interior of or on the exterior of the electronic apparatus 1500. According to an embodiment, the display 1560 may further include a control circuit for controlling the panel 1562, the hologram device 1564, or the projector 1566.

The interface 1570 may include, for example, a high-definition multimedia interface (HDMI) 1572, a universal serial bus (USB) 1574, an optical interface 1576, and a D-subminiature (D-sub) 1578. Additionally or alternatively, the interface 1570 may, for example, include a mobile high-definition link (MHL) interface, a secure digital (SD) card/multi-media card (MMC) interface, or an infrared data association (IrDA) interface.

The audio module 1580 may convert a sound and an electrical signal, and vice versa. The audio module 1580 may process sound information that is input or output through, for example, a speaker 1582, a receiver 1584, earphones 1586, the microphone 1588, or the like.

The camera module 1591 is a device for capturing still and moving images, and according to an embodiment, the camera module 1591 may include one or more image sensors (e.g., a front sensor or a rear sensor), a lens (not illustrated), an image signal processor (ISP, not illustrated), or a flash (e.g., an LED or a xenon lamp, not illustrated).

The power management module 1595 may manage the power of the electronic device 1500. Although not illustrated, the power management module 1595 may include, for example, a power management integrated circuit (PMIC), a charger integrated circuit (IC), or a battery or fuel gauge.

The PMIC may be mounted within, for example, an integrated circuit or an SoC semiconductor. Charging methods may be classified into a wired charging method and a wireless charging method. The charger IC may charge a battery and may prevent an overvoltage or excess current from being induced or flowing from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit, such as a coil loop, a resonance circuit, and a rectifier, may be added for the wireless charging.

The battery gauge may measure, for example, a residual quantity of the battery 1596, and a voltage, a current, or a temperature while charging. The battery 1596 may store or generate electricity, and may supply power to the electronic device 1500 by using the stored or generated electricity. The battery 1596 may include, for example, a rechargeable battery or a solar battery.

The indicator 1597 may indicate a specific state of the electronic device 1500 or a part thereof, for example, a booting state, a message state, a charging state, or the like. The motor 1599 may convert an electrical signal into a mechanical vibration. Although not illustrated, the electronic apparatus 1500 may include a processing unit (e.g., a GPU) for supporting mobile television (TV). The processing unit for supporting mobile TV may process, for example, media data pursuant to a certain standard of Digital Multimedia Broadcasting (DMB), Digital Video Broadcasting (DVB), or media flow.

Each of the above described elements of the electronic device according to various embodiments of the present disclosure may be formed of one or more components, and the name of a corresponding element may vary according to the type of an electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an application-specific integrated circuit (ASIC) chip, a field-programmable gate array (FPGA), and a programmable-logic device for performing certain operations, which are now known or will be developed in the future.

At least some of the devices (e.g., modules or functions thereof) or methods (e.g., operations) according to various embodiments of the present disclosure may be implemented by, for example, by a command stored in a computer-readable storage medium in the form of a programming module. When an instruction is implemented by one or more processors (for example, the application processor 1510), one or more processors may execute a function corresponding to the instruction. The computer-readable storage medium may be, for example, the memory 1530. At least a part of the programming module may be implemented (for example, executed) by, for example, the application processor 1510. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. Any of the hardware devices as described above may be configured to work as one or more software modules in order to perform the operations according to an embodiment of the present disclosure, and vice versa.

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. An antenna device comprising:
    a base member;
    an antenna that is attached to the base member; and
    a cover member that is attached to surround at least a part of the base member and at least a part of the antenna,
    wherein a first part of the base member that is attached to the cover member has a melting temperature equal to or lower than that of the cover member, and
    a second part of the base member to which the antenna is attached has a higher melting temperature than the cover member.

2. The antenna device of claim 1, wherein the second part is molded to be coupled to the first part after the first part is molded.

3. The antenna device of claim 1, wherein the first and second parts are molded using double injection molding.

4. The antenna device of claim 1, wherein the cover member is molded to be attached to the antenna and the base member, which are integrated with each other, using insert molding.

5. The antenna device of claim 1, wherein the cover member comprises at least a part of a housing that forms an external appearance of an electronic device.

6. A method of manufacturing an antenna device, comprising:
    molding a base member;
    attaching an antenna to the base member; and
    molding a cover member that is attached to surround at least a part of the base member and at least a part of the antenna,
    wherein a first part of the base member that is attached to the cover member has a melting temperature equal to or lower than that of the cover member, and
    a second part of the base member to which the antenna is attached has a higher melting temperature than the cover member.

7. The method of claim 6, wherein the second part which is coupled to the first part is molded after the first part is molded.

8. The method of claim 6, wherein the base member is molded using double injection molding.

9. The method of claim 6, wherein the antenna is attached to the second part using one of laser direct structuring (LDS), stenciling, printing, and attaching.

10. The method of claim 6, wherein the cover member is molded to be attached to the antenna and the base member, which are integrated with each other, using insert molding.

* * * * *